US008966055B2

(12) United States Patent
Mittal et al.

(10) Patent No.: US 8,966,055 B2
(45) Date of Patent: Feb. 24, 2015

(54) SYSTEM AND METHOD FOR FACILITATING CAPACITY MONITORING AND RECOMMENDING ACTION FOR WIRELESS NETWORKS

(75) Inventors: Mukesh K. Mittal, San Diego, CA (US); Sunil S. Patil, San Diego, CA (US); Francesco Pica, San Diego, CA (US); Kausik Ray Chaudhuri, San Diego, CA (US); Umair Ahmed Syed, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1117 days.

(21) Appl. No.: 12/478,349

(22) Filed: Jun. 4, 2009

(65) Prior Publication Data

US 2010/0123575 A1    May 20, 2010

Related U.S. Application Data

(60) Provisional application No. 61/114,925, filed on Nov. 14, 2008, provisional application No. 61/168,123, filed on Apr. 9, 2009.

(51) Int. Cl.
*G06F 15/173* (2006.01)
*H04L 12/24* (2006.01)
*H04L 12/26* (2006.01)

(52) U.S. Cl.
CPC ........ *H04L 41/0609* (2013.01); *H04L 43/0805* (2013.01); *H04L 41/22* (2013.01); *H04L 43/16* (2013.01)
USPC ........................................................ 709/224

(58) Field of Classification Search
USPC .................................................. 709/223, 221
See application file for complete search history.

(56) References Cited

U.S. PATENT DOCUMENTS

| 7,016,809 B1 * | 3/2006 | Gotwals et al. ............... 702/185 |
| 7,092,707 B2 * | 8/2006 | Lau et al. ...................... 455/423 |
| 7,151,438 B1 * | 12/2006 | Hall et al. ................ 340/286.06 |

(Continued)

FOREIGN PATENT DOCUMENTS

| CN | 101136805 A | 3/2008 |
| KR | 20060055189 A | 5/2006 |

(Continued)

OTHER PUBLICATIONS

International Search Report & Written Opinion—PCT/US2009/064649, International Search Authority—European Patent Office—Feb. 2, 2010.

(Continued)

*Primary Examiner* — Richard G Keehn
(74) *Attorney, Agent, or Firm* — Abdollah Katbab

(57) ABSTRACT

A method and apparatus for facilitating capacity monitoring and recommending action for a wireless network is provided. The method may comprise: obtaining data associated with one or more capacity attributes and one or more key performance indicators (KPIs) associated with a network, calculating network level values for the one or more KPIs from the obtained data, generating performance data graphs by plotting a first of the one or more KPIs against a second of the one or more KPIs, analyzing the one or more performance data graphs to determine at least one alarm threshold, and monitoring the one or more capacity attributes to determine if any of the at least one alarm thresholds has been triggered.

29 Claims, 21 Drawing Sheets

(56) References Cited

U.S. PATENT DOCUMENTS

| | | | |
|---|---|---|---|
| 7,225,103 B2* | 5/2007 | Beresniewicz et al. | 702/179 |
| 7,444,263 B2* | 10/2008 | White et al. | 702/180 |
| 7,552,208 B2 | 6/2009 | Lubrecht et al. | |
| 7,617,313 B1* | 11/2009 | Washburn et al. | 709/224 |
| 7,843,963 B1* | 11/2010 | Dispensa et al. | 370/468 |
| 7,941,136 B2* | 5/2011 | Reed et al. | 455/424 |
| 8,086,708 B2* | 12/2011 | Breitgand et al. | 709/223 |
| 2002/0152303 A1 | 10/2002 | Dispensa | |
| 2002/0198985 A1 | 12/2002 | Fraenkel et al. | |
| 2003/0110007 A1* | 6/2003 | McGee et al. | 702/179 |
| 2005/0219151 A1* | 10/2005 | Li et al. | 345/7 |
| 2009/0129339 A1* | 5/2009 | Young et al. | 370/331 |
| 2009/0300166 A1* | 12/2009 | Chen et al. | 709/224 |

FOREIGN PATENT DOCUMENTS

| | | |
|---|---|---|
| WO | WO2005071890 | 8/2005 |
| WO | WO2008040021 | 4/2008 |

OTHER PUBLICATIONS

Taiwan Search Report—TW098138882—TIPO—Feb. 6, 2013.

* cited by examiner

SYSTEM AND METHOD FOR FACILITATING CAPACITY MONITORING AND RECOMMENDING ACTION FOR WIRELESS NETWORKS

CLAIM OF PRIORITY UNDER 35 U.S.C. §119

The present Application for Patent claims priority to Provisional Application No. 61/114,925 entitled "Capacity Monitoring Process & Recommended Action For Wireless Network" filed Nov. 14, 2008, and Provisional Application No. 61/168,123 entitled "Capacity Monitoring Process & Recommended Action For Wireless Network" filed Apr. 9, 2009 and assigned to the assignee hereof and hereby expressly incorporated by reference herein.

BACKGROUND

1. Field

The present application relates generally to wireless communications, and more specifically to methods and systems for monitoring wireless network capacity.

2. Background

Wireless communication systems are widely deployed to provide various types of communication (e.g., voice, data, multimedia services, etc.) to multiple users. These systems may be multiple-access systems capable of supporting communication with multiple users by sharing the available system resources (e.g., bandwidth and transmit power). Examples of such multiple-access systems include Universal Mobile Telecommunications System (UMTS), code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, wireless communication systems can contemporaneously support communication for multiple mobile devices. Each mobile device can communicate with one or more network elements (e.g. base stations) via transmissions on forward and reverse links. The forward link (or downlink) refers to the communication link from base stations to mobile devices, and the reverse link (or uplink) refers to the communication link from mobile devices to base stations.

Currently, wireless network operators have difficulties in monitoring networks in a vendor-independent methodology/decision framework. Consequently, it would be desirable to have an efficient method and/or apparatus for monitoring key capacity attributes of wireless networks operating under mixed data and voice usage scenarios and to allow for proactive actions to be taken to avoid any adverse impact on user service perception.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with generating performance measurements for a wireless network. According to one aspect, a method and apparatus for facilitating capacity monitoring and recommending action for a wireless network is provided. The method may comprise: obtaining data associated with one or more capacity attributes and one or more key performance indicators (KPIs) associated with a network, calculating network level values for the one or more KPIs from the obtained data, generating performance data graphs by plotting a first of the one or more KPIs against a second of the one or more KPIs, analyzing the one or more performance data graphs to determine at least one alarm threshold, and monitoring the one or more capacity attributes to determine if any of the at least one alarm thresholds has been triggered.

Yet another aspect relates to at least one processor configured to facilitate capacity monitoring and recommending action for a wireless network. The at least one processor can include a first module for obtaining data associated with one or more capacity attributes and one or more key performance indicators (KPIs) associated with a network, a second module for calculating network level values for the one or more KPIs from the obtained data, a third module for generating performance data graphs by plotting a first of the one or more KPIs against a second of the one or more KPIs, a fourth module for analyzing the one or more performance data graphs to determine at least one alarm threshold, and a fifth module for monitoring the one or more capacity attributes to determine if any of the at least one alarm thresholds has been triggered.

Still another aspect relates to a computer program product comprising a computer-readable medium. The computer-readable medium can include a first set of codes for causing a computer to obtain data associated with one or more capacity attributes and one or more key performance indicators (KPIs) associated with a network, a second set of codes for causing a computer to calculate network level values for the one or more KPIs from the obtained data, a third set of codes for causing a computer to generate performance data graphs by plotting a first of the one or more KPIs against a second of the one or more KPIs, a fourth set of codes for causing a computer to analysis the one or more performance data graphs to determine at least one alarm threshold, and a fifth set of codes for causing a computer to monitor the one or more capacity attributes to determine if any of the at least one alarm thresholds has been triggered.

Yet another aspect relates to an apparatus. The apparatus can include means for obtaining data associated with one or more capacity attributes and one or more key performance indicators (KPIs) associated with a network, means for calculating network level values for the one or more KPIs from the obtained data, means for generating performance data graphs by plotting a first of the one or more KPIs against a second of the one or more KPIs, means for analyzing the one or more performance data graphs to determine at least one alarm threshold, and means for monitoring the one or more capacity attributes to determine if any of the at least one alarm thresholds has been triggered.

Another aspect relates to an apparatus. The apparatus can include a performance information module operable for: obtaining data associated with one or more capacity attributes and one or more key performance indicators (KPIs) associated with a network, calculating network level values for the one or more KPIs from the obtained data, generating performance data graphs by plotting a first of the one or more KPIs against a second of the one or more KPIs, and analyzing the one or more performance data graphs to determine at least one alarm threshold, and a network monitoring module operable for monitoring the one or more capacity attributes to determine if any of the at least one alarm thresholds has been triggered.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described apparatus and methods provide a framework for monitoring capacity attributes for wireless networks with mixed voice and data traffic usage. The described apparatus and methods are applicable to any wireless network and are independent of equipment vendors' products. Also, the described apparatus and methods help network operators specify alarm thresholds for each capacity attribute based on severity of impact on network performance, and define action items to perform in order to avoid any adverse impacts on either network performance or user perception. The described apparatus and methods define a common decision framework which can be applied to any wireless operator and is independent of the infrastructure, handset or any other equipment vendor's products.

FIGS. 1 through 5 and FIG. 7 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

A capacity monitoring process may be applied to a network of an operator. In some aspects, the capacity monitoring process identifies cells with relatively high voice and data traffic, and monitors those cells. A relatively high amount of voice and data traffic may be defined relative to other cells in a given network, and a value of such amount may vary from one operator to another or from one network to another. Also, as such networks are dynamic; the identified high traffic cells may change over time.

Figure 1:
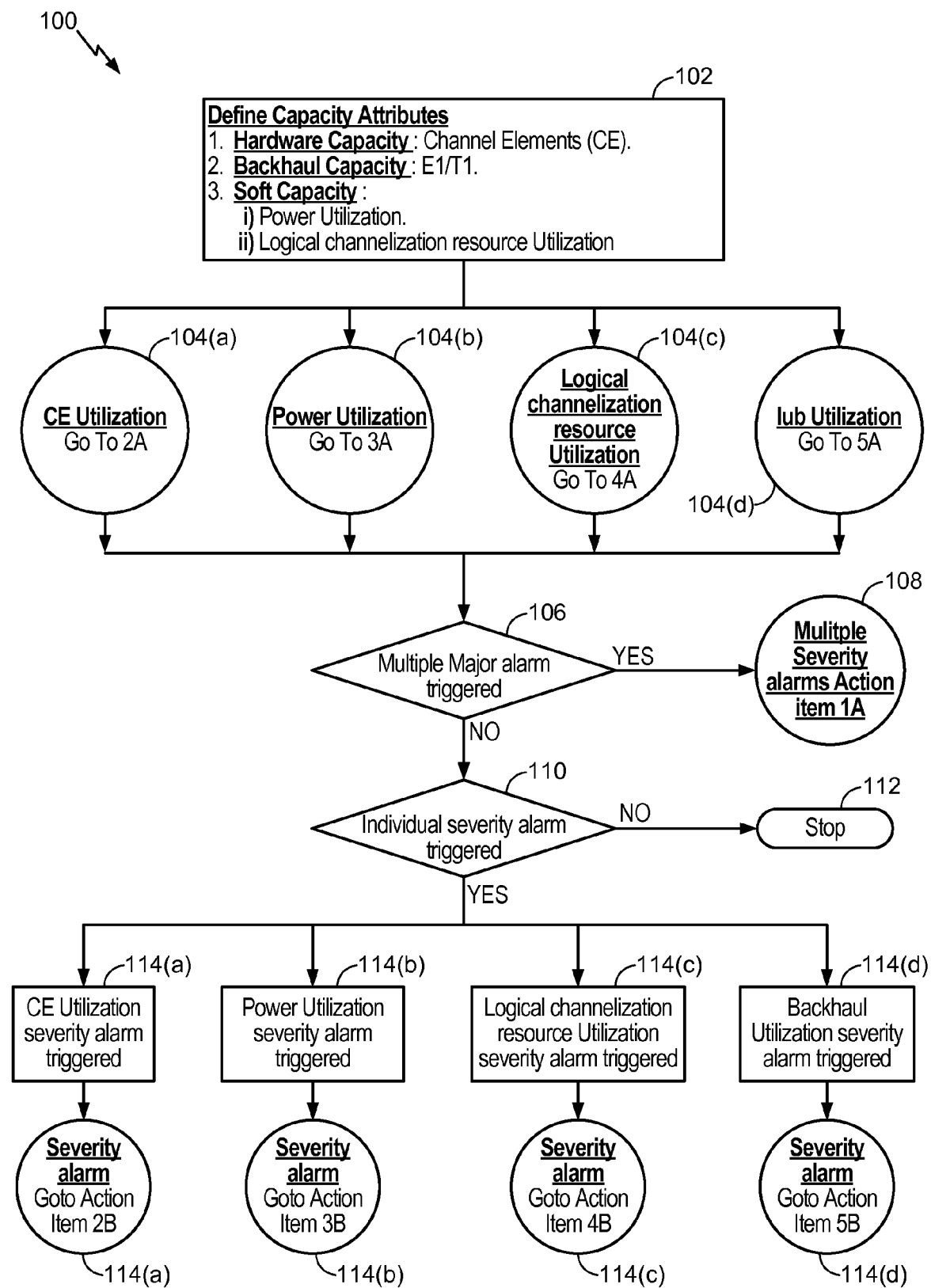
FIG. 1 is a flowchart of an aspect of an overview of a network capacity monitoring process.

Referring to FIG. 1, at reference numeral 102, capacity attributes may be defined. For example, capacity attributes may be grouped into three main categories: hardware capacity, e.g. channel elements (CE) or the type of hardware installed at a NodeB or base station, and how such hardware impacts the capacity of the network; backhaul capacity, e.g. the capacity of an E1 or T1 line; and soft capacity, which may have two subcategories: power utilization and logical channelization resource utilization.

After defining those capacity attributes, then at reference numerals 104(a) through 104(d) categories related to capacity attribute utilization may be evaluated. These categories may include: channel element utilization, which relates to hardware capacity, power utilization, which relates to soft capacity, logical channelization resource utilization, which also relates to soft capacity, and Iub utilization, e.g. the interface between the NodeB and the radio network controller (RNC), which relates to backhaul capacity. Subsequent FIGS. 2A, 3A, 4A and 5A provide the details for monitoring each of these capacity attribute utilization categories. In essence, however, for each capacity attribute utilization category key performance indicators (KPIs) are calculated, selected KPIs are plotted against other KPIs, and one or more alarm thresholds or severity levels, against which the capacity attributes may subsequently be compared, are determined. It should be noted that although FIG. 1 depicts four categories, one of ordinary skill in the art would recognize that the described method may be applicable to additional capacity attribute categories related to a networks hardware, software and backhaul capacities.

In any case, after all of the analytics on each category, at reference numeral 106, analysis of all the categories is combined and it is determined whether multiple alarms has been triggered. If at reference numeral 106, it is determined that multiple alarms have been triggered, then at reference numeral 108 the processes described in FIG. 1A determines the severity of alarms triggered in a combined fashion. For example, a multiple severity alarms triggered check may determine whether a multiple severity scenario exists for any cell. These processes are described in further depth with reference to FIG. 1A.

In one aspect, there is a multiple alarm check (reference numeral 106) as well as an individual alarm check (reference numeral 110). These two checks are structured to prioritize the most severe issues. If multiple alarms do not exist, then at reference numeral 110 it is determined if, for each individual cell, any individual severity alarm has triggered. If it is determined that an individual severity alarm has been triggered, then at reference numerals 114(a) to 114(d), the individual severity alarm that has been triggered is identified and at reference numerals 116(a) to 116(d) the method proceeds according to applicable category-specific flowcharts depicted in FIGS. 2B, 3B, 4B and 5B. By contrast, if at reference numeral 110 no alarms have been triggered, then at reference numeral 112 the process is stopped. In such a case, the process may be restarted through user input, periodically, upon detection of a change to a component of the network, etc.

Figure 1A:
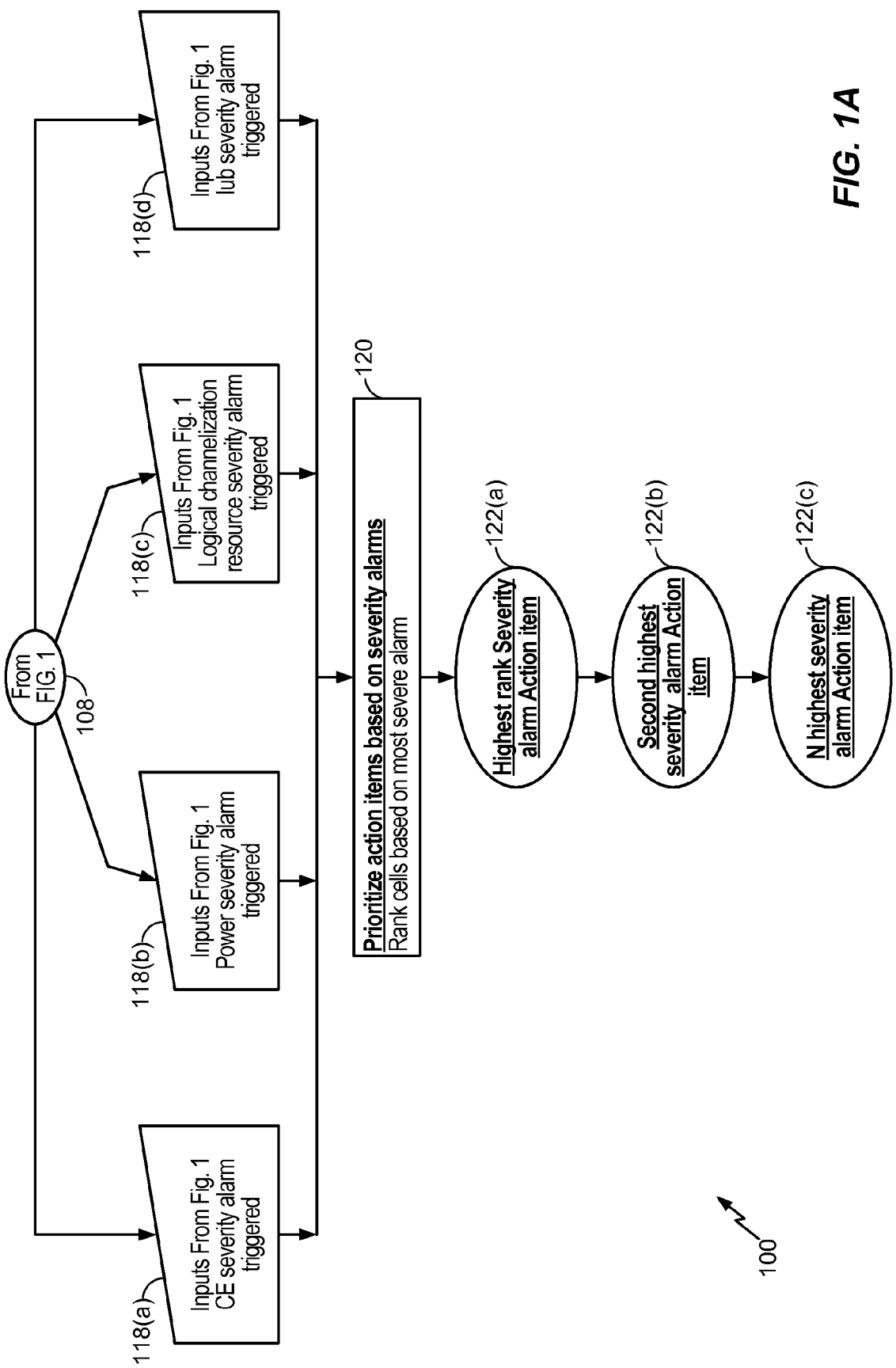
FIG. 1A is a flowchart of an aspect of a multiple severity alarm triggers aspect of the flowchart of FIG. 1.

Referring to FIG. 1A, the depicted flowchart relates to multiple severity alarm triggers occurring, where the inputs may be from the more than one of the four categories: channel element, power, the channelization resource and the backhaul. Alarms being trigger by at least two of these four categories are depicted at references numeral 118(a) to 118(d). It should be further noted that although FIG. 1A depicts four categories, one of ordinary skill in the art would recognize that the described method may be applicable to additional non-depicted categories related to a networks hardware, software and backhaul capacities. At reference numeral 120, the method further includes prioritizing action items based on the severity alarms. In other words, analysis performed at reference numeral 120 considers the four categories and provides a combined impact or severity on a particular cell. Reference numerals 122(a)-122(c) depict the prioritization including ranking the cells in terms of the combined severity of the individual resources. As such, once the ranking process depicted in FIG. 1A is done, then the method proceeds in the process depicted in FIG. 1 to process prioritized action items, where the action items are processed using at least one of the applicable category-specific methods depicted in FIGS. 2B, 3B, 4B and 5B.

The specific alarm decision, capacity monitoring, and severity alarm and action item methodologies will now be discussed. Prior to cell monitoring in a network, network wide metrics are determined to provide applicable alarm thresholds. Generation of at least one alarm threshold for a capacity attribute is depicted with respect to FIG. 2.

Figure 2:
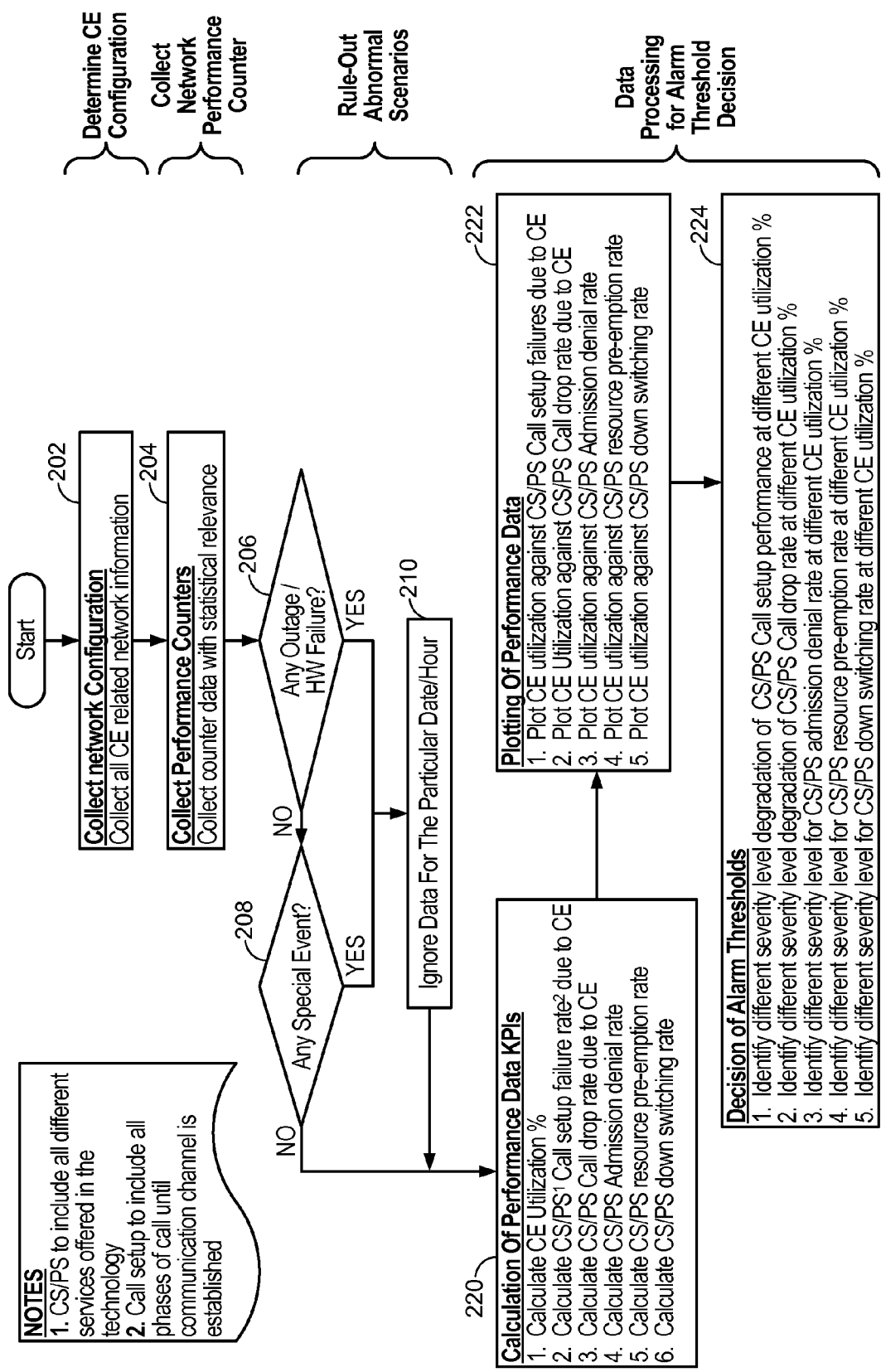
FIG. 2 is a flowchart of an aspect of an alarm decision aspect for a CE portion of the flowchart of FIG. 1.

Referring to FIG. 2, at reference numeral 202, channel element (CE) configuration for at least a portion of the network is determined. For example, the CE configuration may be determined by collecting all CE related network information.

Next to be described, at reference numeral 204, CE-related network performance information may be collected. For example, such information may include counter data, such as counter data with statistical relevance, and such counters may be collected for individual consideration or for combining together to form new, combined performance information. Such information may be collected for a given time period, for example, a historical time period that may be representative of a long term operation of the network.

Further, determining applicable network metrics may include ruling out abnormal scenarios. At reference numeral 206, it is determined whether a network outage or hardware failure had been detected for a particular date and/or hour or location. As such, the known outage or failure data may be excluded, at reference numeral 210, from the data set used to determine network alarm thresholds. Furthermore, at reference number 208, it is determined whether any special have been detected for a particular date and/or hour or location. As such, the known special event data may be excluded, at reference numeral 210, from the data set used to determine network alarm thresholds. Therefore data based on an outage or hardware failure or based on a special event that has impacted network performance for a particular time, or at a particular location, but that is not a prevalent event relevant to long term network performance may be ignored.

Further, the method includes data processing for determining an alarm threshold decision. At reference numeral 220, data processing may include calculating performance data KPIs, such as, but not limited to: CE utilization percentage; circuit switch (CS) and/or packet switch (PS) call setup failure rate due to the particular CE; CS and/or PS call drop rate due to the particular CE; CS and/or PS admission denial rate; CS and/or PS resource preemption rate; and, CS and/or PS down switching. As noted above, such KPIs may be based on individual counters, e.g. a call drop, or based on a combination of counters.

Further, at reference numeral 222, the data processing may include plotting of the performance data, such as but not limited to, plotting one or more of: a utilization percentage, such as CE utilization percentage versus each of the above-noted calculated performance data KPIs. In other words, in some aspects, for each category, each KPI is plotted to see how it varies with respect to percentage utilization of a capacity attribute.

At reference number 224, the data processing may include generating a decision of alarm thresholds, such as, but not limited to, one or more severity levels determined from one or more of the plotted performance data, along with a corresponding action item to take in response to detecting the give severity alarm. In one aspect, based on analyzing the respective plots, a correlation can be determined between each KPI and the corresponding network utilization with respect to one or more network capacity impacts, e.g. performance degradations, and corresponding actions may be triggered to attempt to proactively resolve the given performance degradation, as is discussed below with respect to FIG. 2B.

Thus, the result of the methodology of FIG. 2 is a defined one or more severity alarm thresholds for the CE component of network capacity.

Figure 2A:
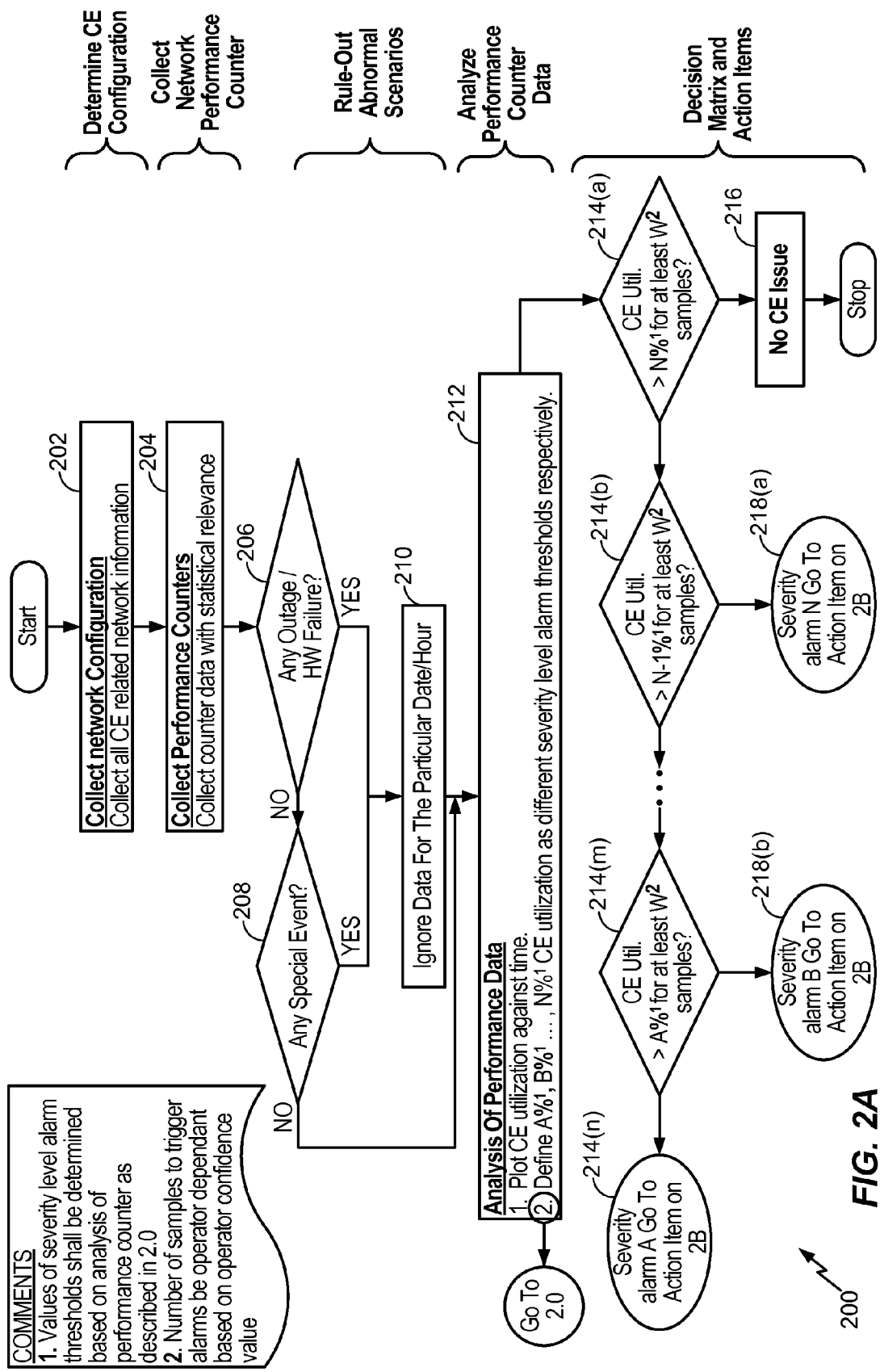
FIG. 2A is a flowchart of an aspect of a capacity monitoring aspect for a CE portion of the flowchart of FIG. 1.

Referring to FIG. 2A, in one aspect, for example, once the decision on severity alarm thresholds is made, then the present apparatus and methods include an on-going capacity monitoring process for a network. Similar to the alarm decision process, the capacity monitoring includes determining the CE configuration (202), collecting CE-related network performance information (204), and ruling out abnormal scenarios (206,208,210). Further, at reference number 212, the method includes analyzing samples of the collected performance data to determine whether or not a severity alarm threshold has been achieved. In one aspect, the one or more severity alarm thresholds for the CE utilization of network capacity are implemented as triggers for a network component being monitored over time. In one aspect, the number of samples of performance data used to form a valid determination of the triggering of a severity alarm may be network operator-specific. At reference numerals 214(a) to 214(n), if a given sample size of performance data does not result in a determination that a threshold has been achieved, then at reference numeral 216 it is determined that there is no CE-related performance issue, and the monitoring process continues. On the other hand, if at reference numerals 214(a) to 214(n) one or more severity alarms have been achieved, then a corresponding action item is triggered at reference numerals 218(a) to 218(n). In the depicted flowchart, the number of severity alarms determines the value for (n) with respect to reference numerals 214(a)-(n) and 218(a)-(n). For example, if only "major" and "minor" threshold levels have been defined with reference to FIG. 2, then (n) equals two.

Figure 2B:
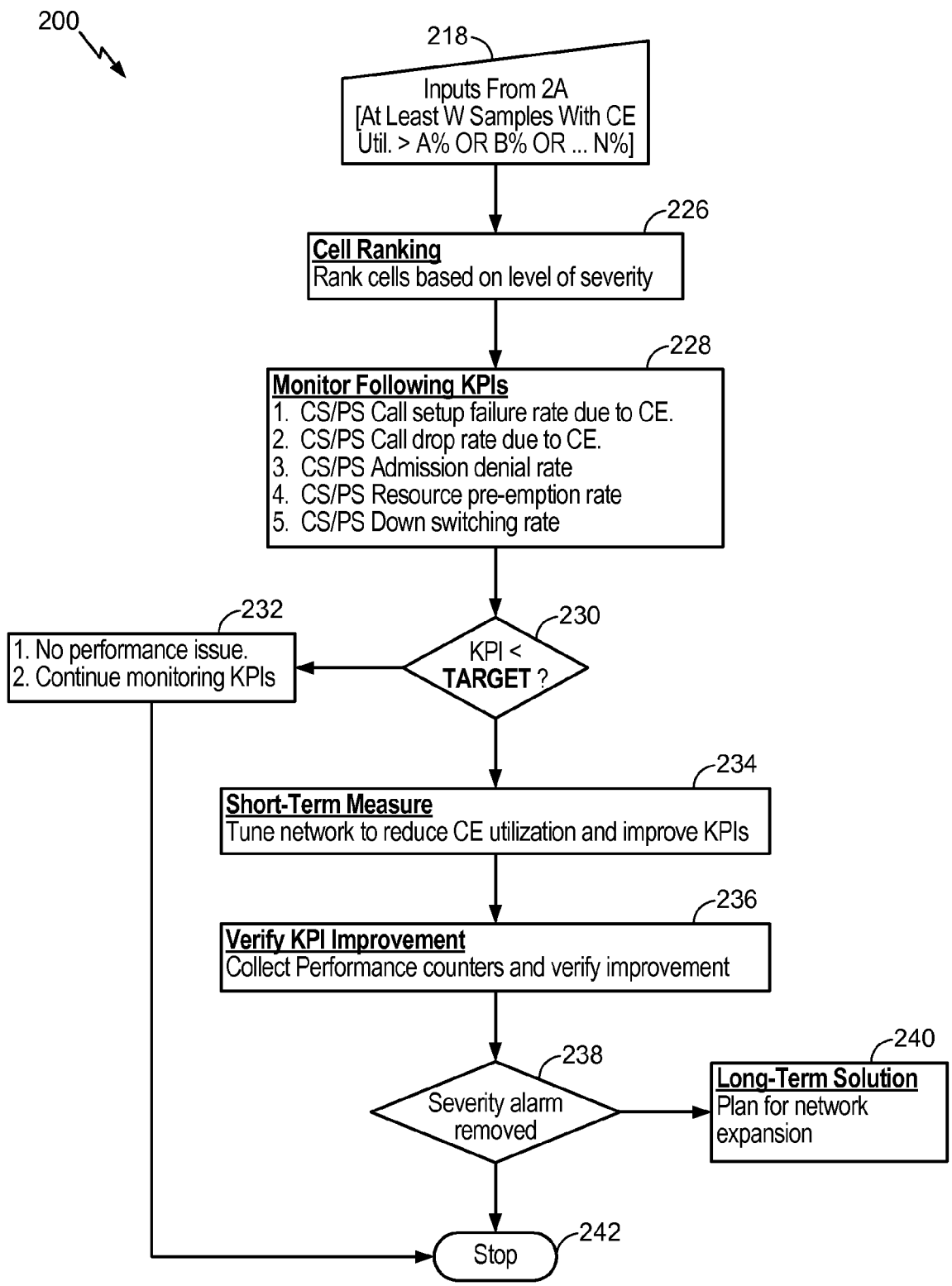
FIG. 2B is a flowchart of an aspect of a severity alarm and action item aspect for a CE portion of the flowchart of FIG. 1.
Figure 3:
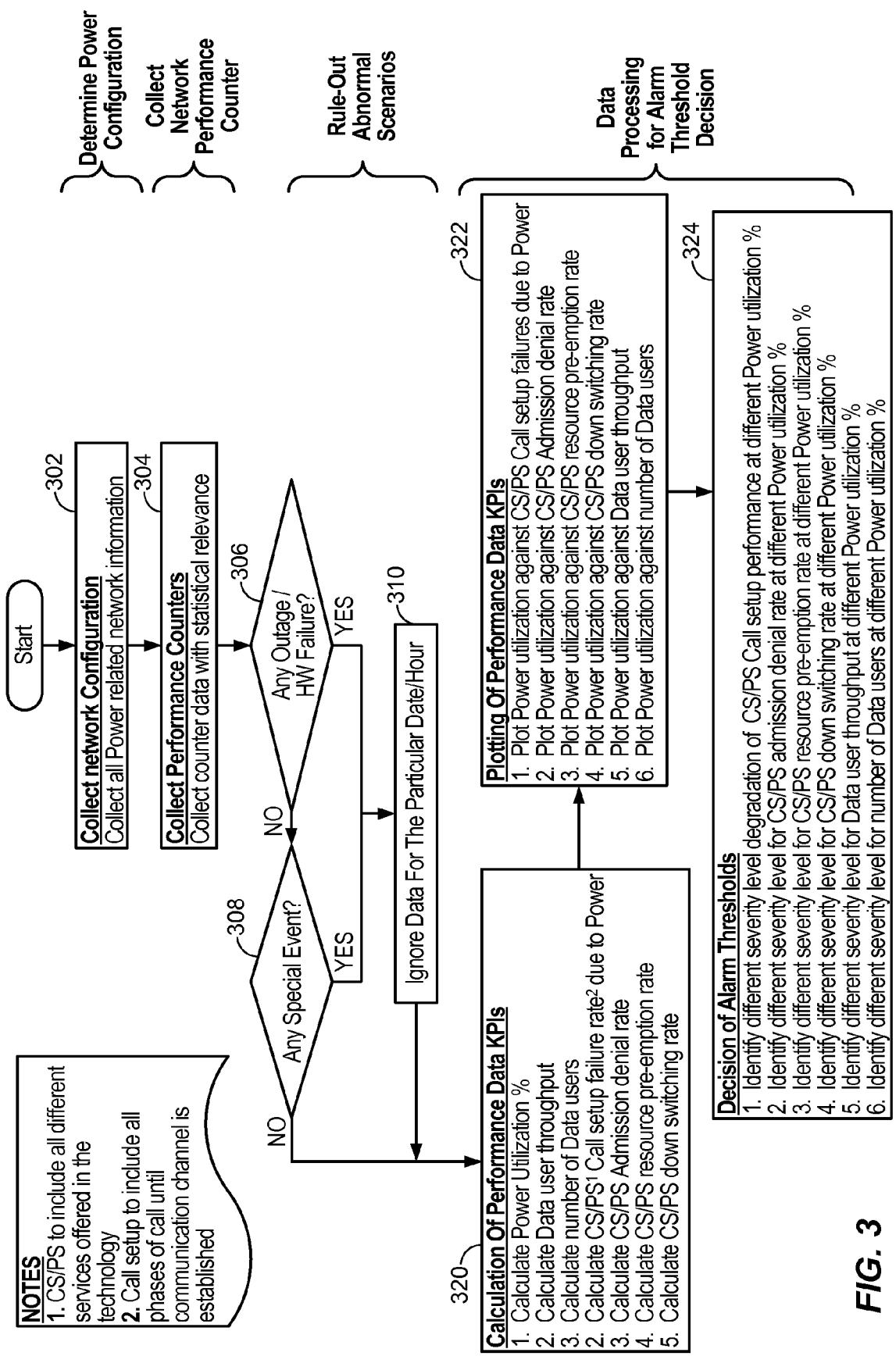
FIG. 3 is a flowchart of an aspect of an alarm decision aspect for a power utilization portion of the flowchart of FIG. 1.
Figure 3A:
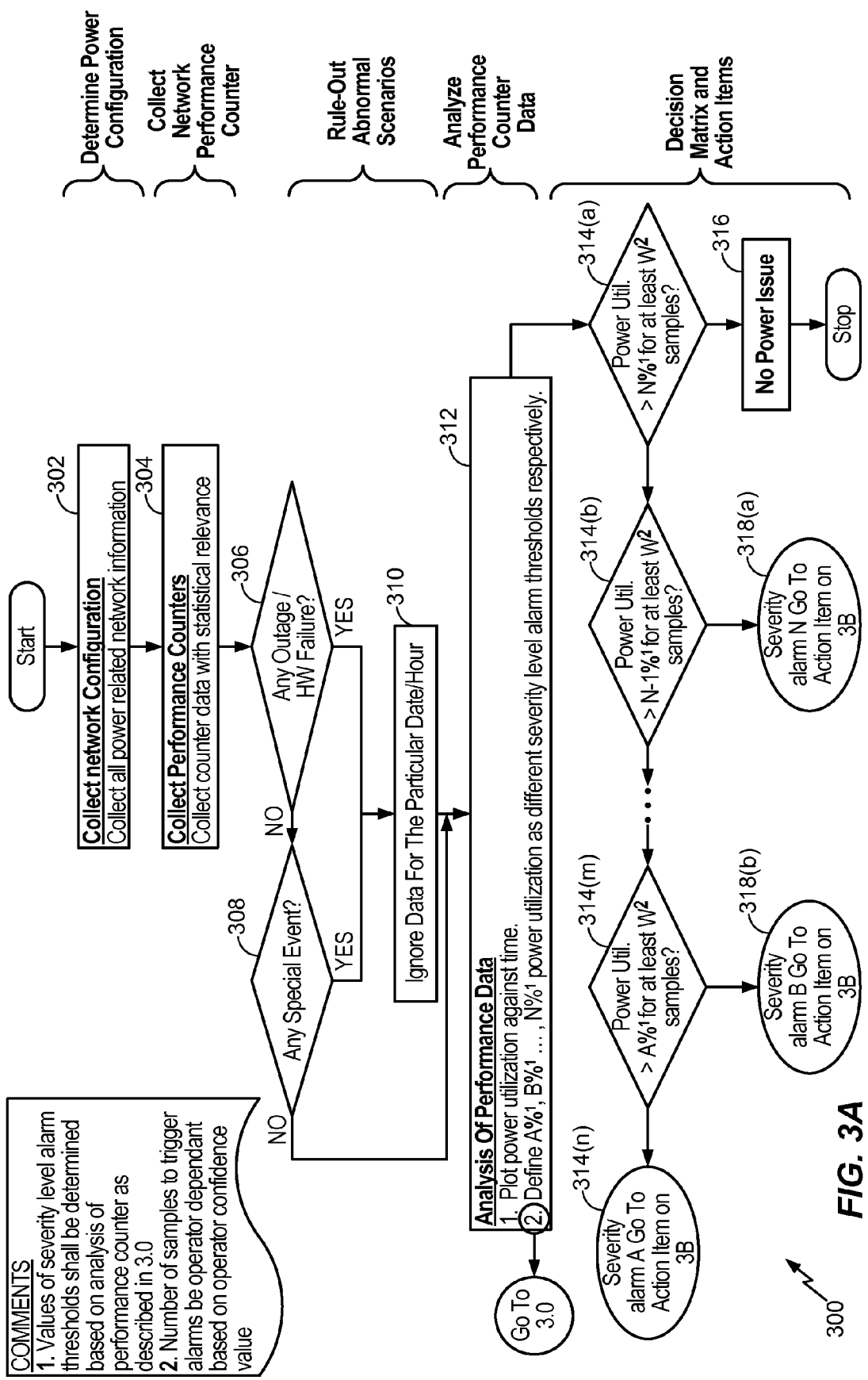
FIG. 3A is a flowchart of an aspect of a capacity monitoring aspect for a power utilization portion of the flowchart of FIG. 1.
Figure 3B:
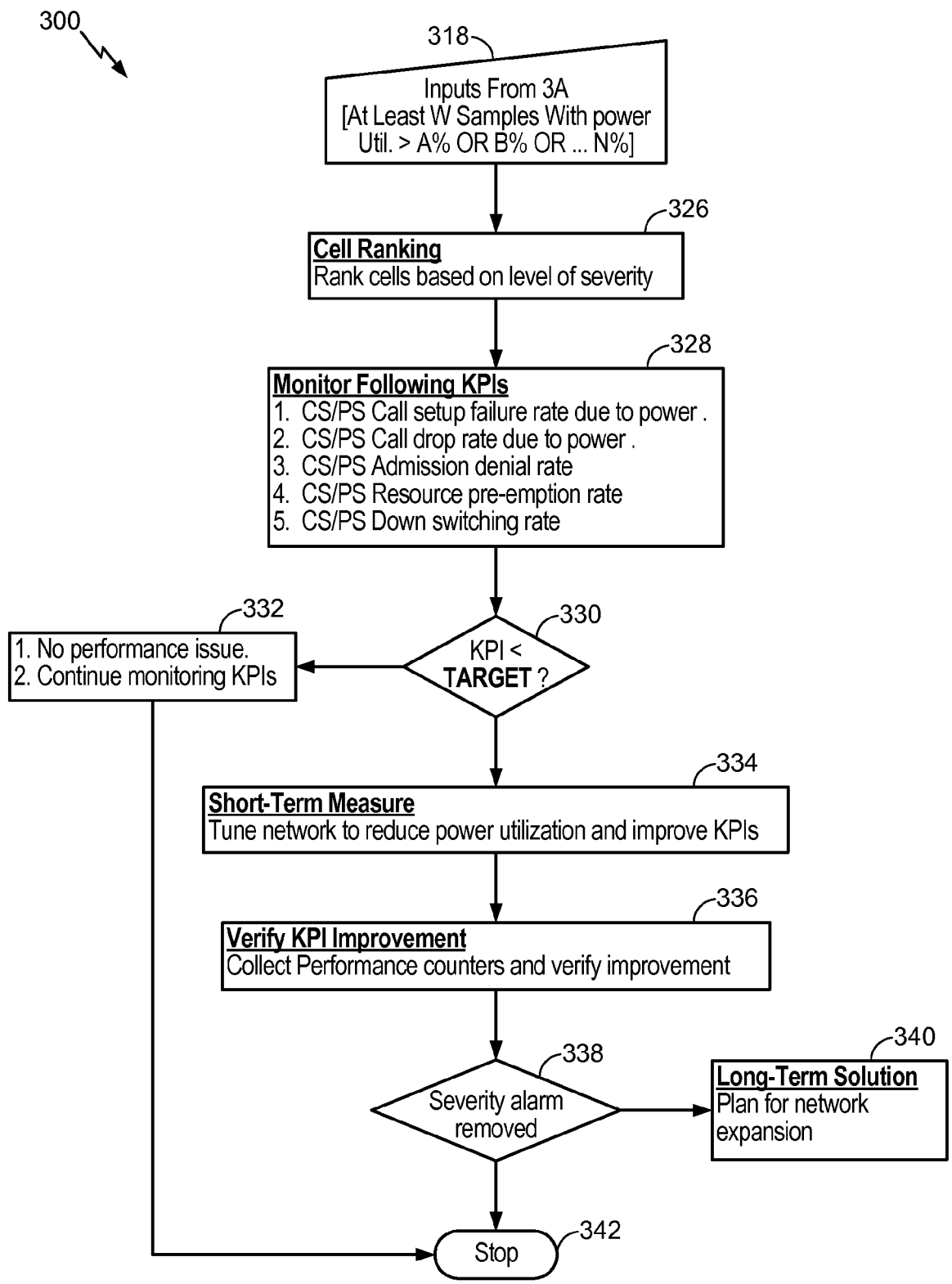
FIG. 3B is a flowchart of an aspect of a severity alarm and action item aspect for a power utilization portion of the flowchart of FIG. 1.
Figure 4:
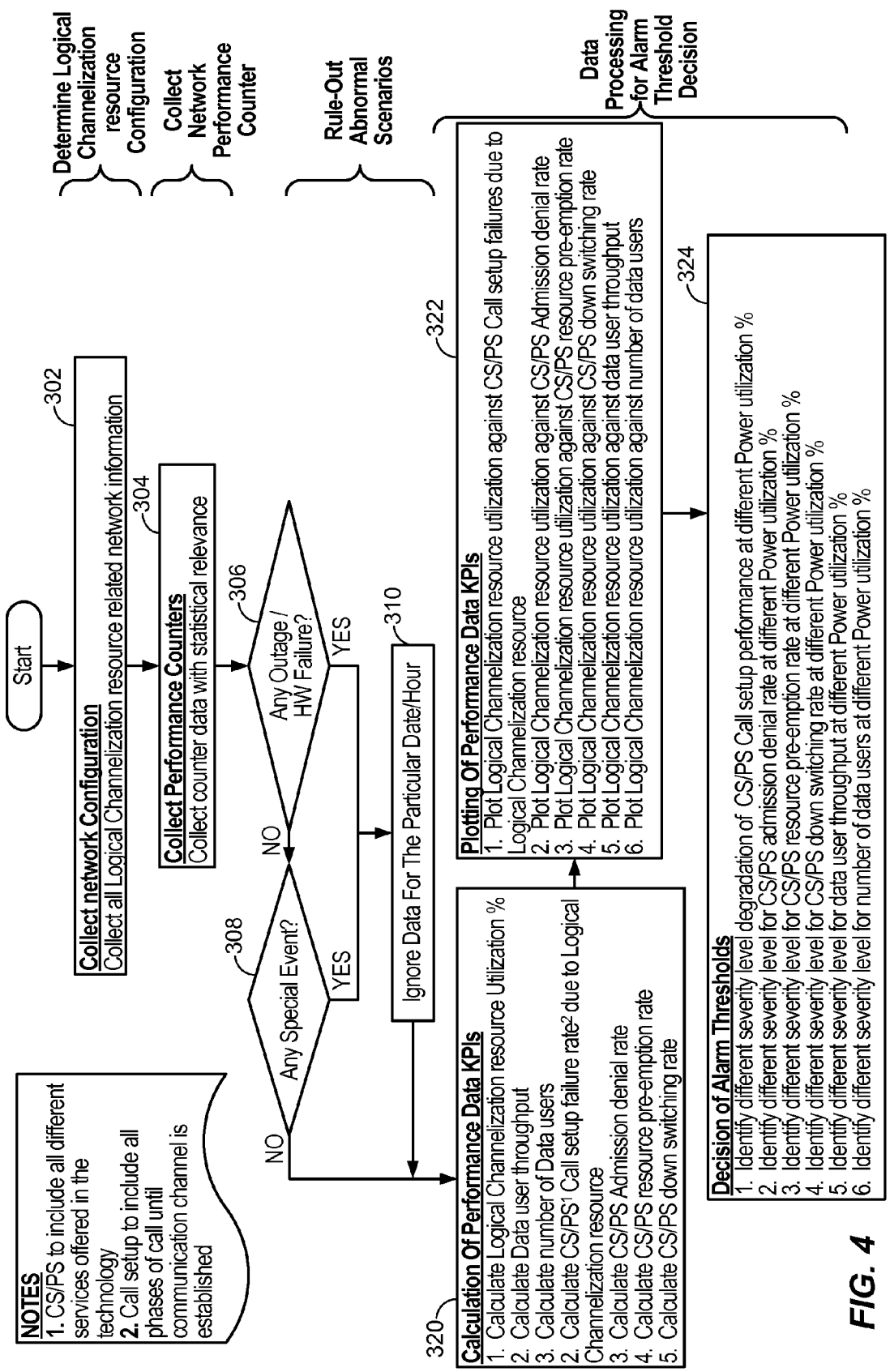
FIG. 4 is a flowchart of an aspect of an alarm decision aspect for a logical channelization resource portion of the flowchart of FIG. 1.
Figure 4A:
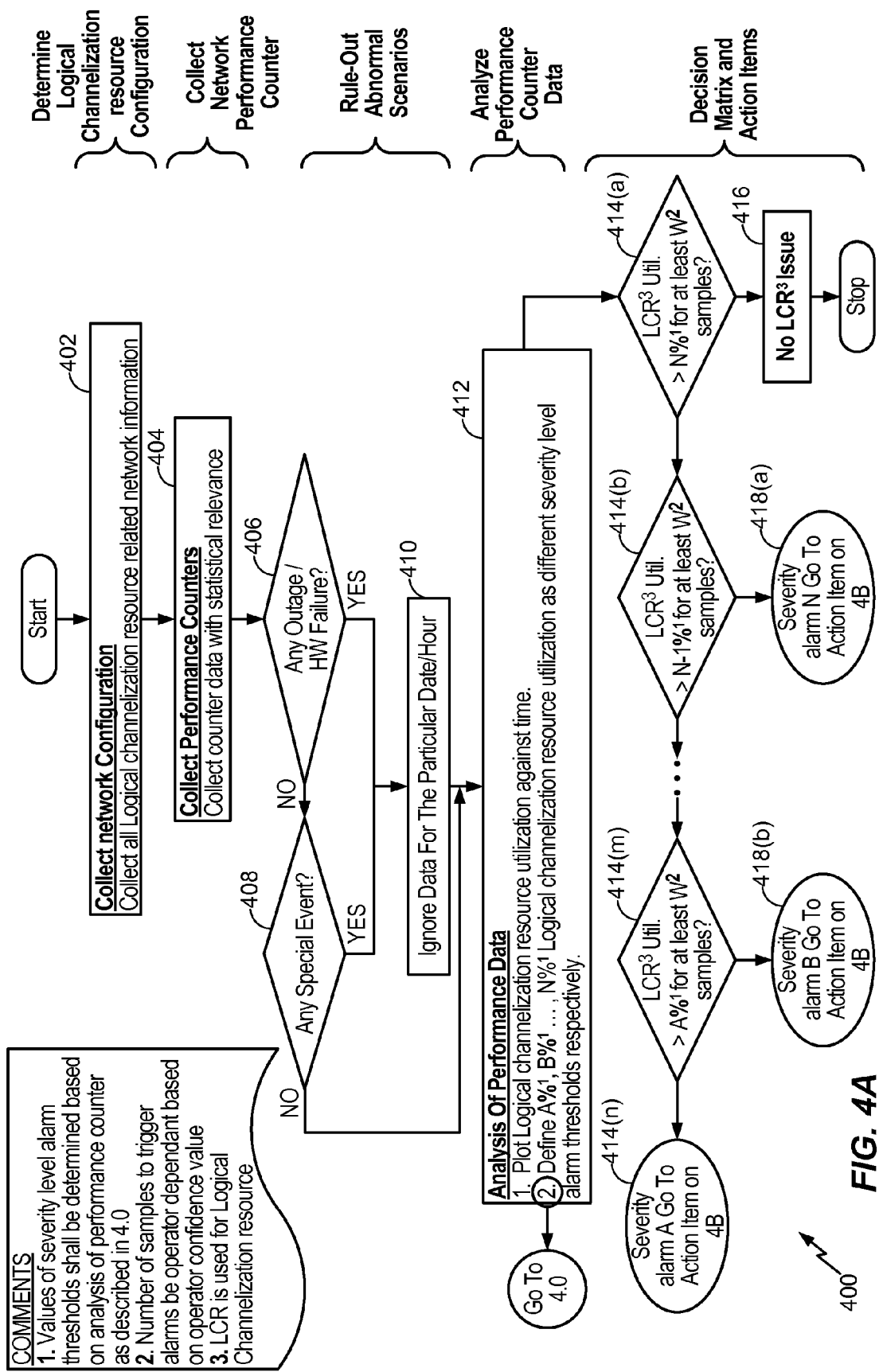
FIG. 4A is a flowchart of an aspect of a capacity monitoring aspect for a logical channelization resource portion of the flowchart of FIG. 1.
Figure 4B:
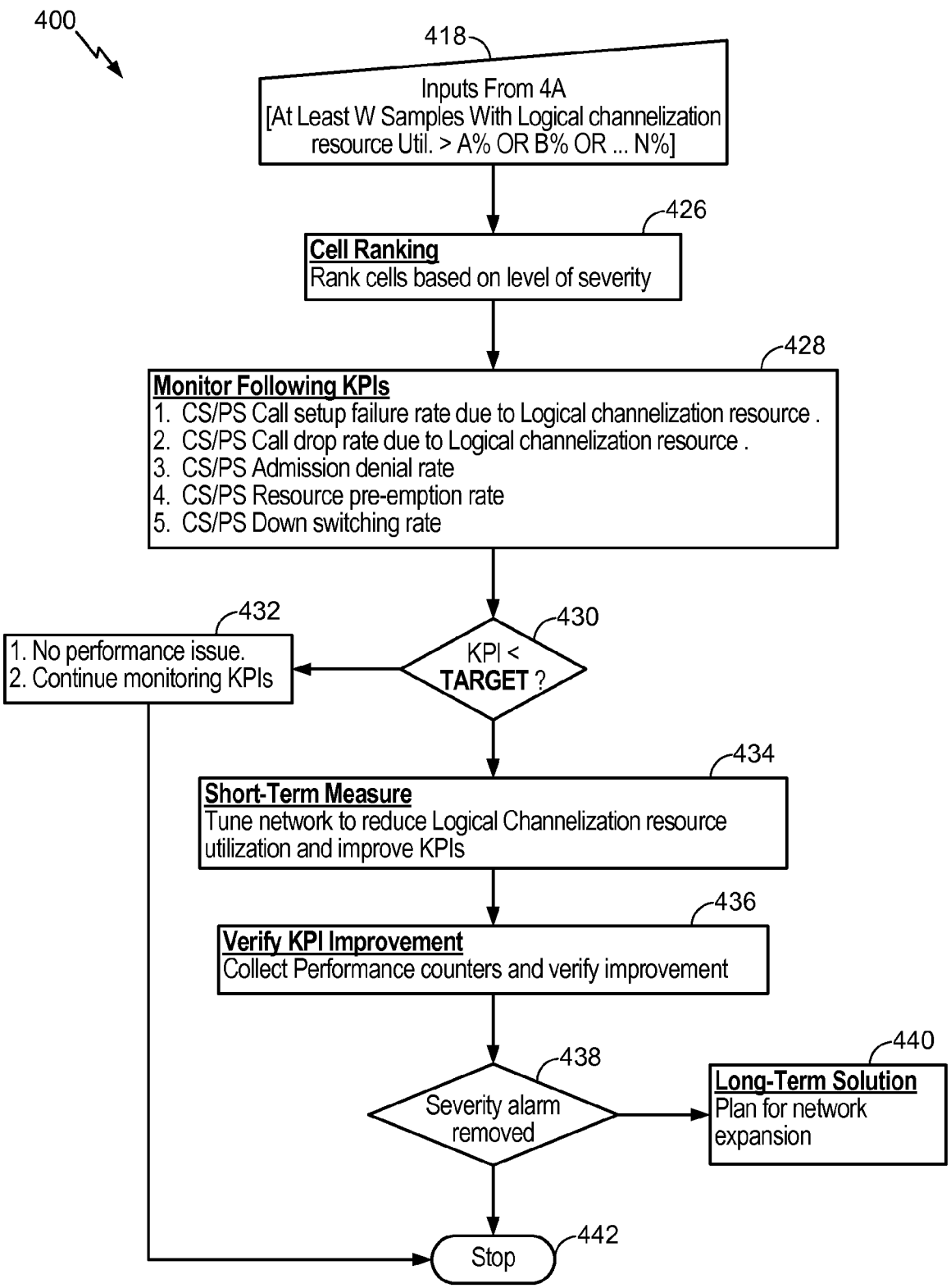
FIG. 4B is a flowchart of an aspect of a severity alarm and action item aspect for a logical channelization resource portion of the flowchart of FIG. 1.
Figure 5:
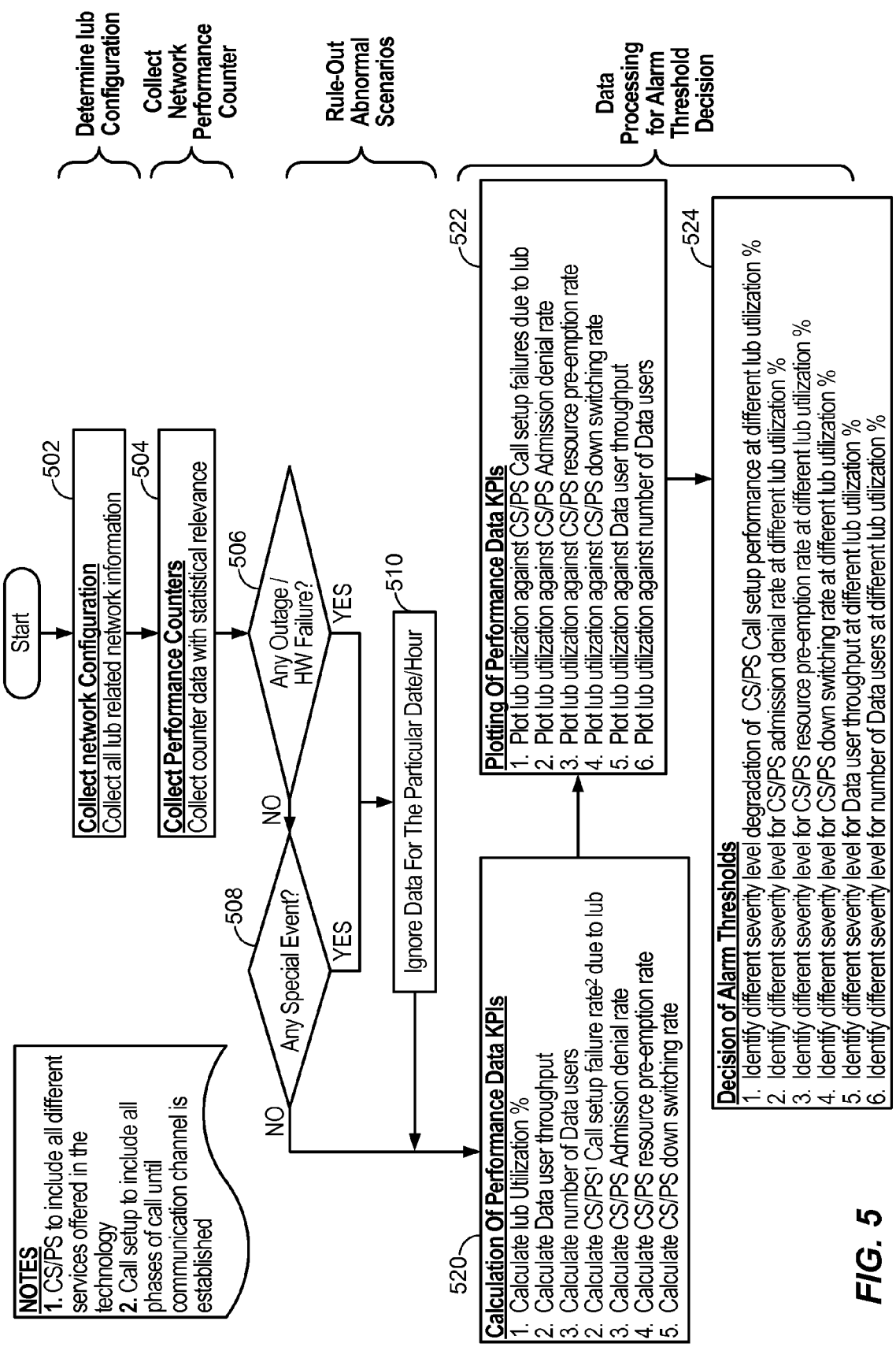
FIG. 5 is a flowchart of an aspect of an alarm decision aspect for a backhaul portion of the flowchart of FIG. 1.
Figure 5A:
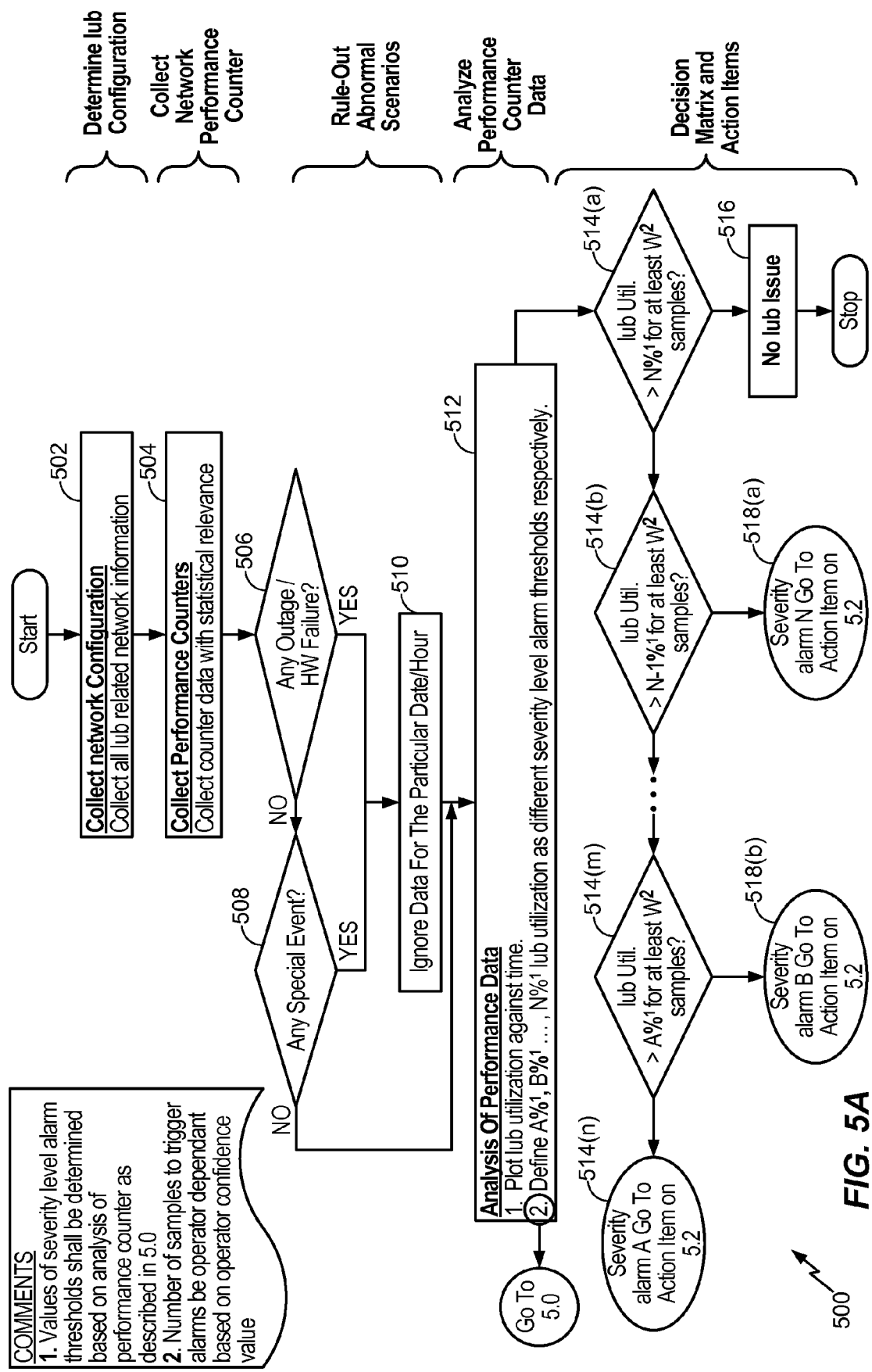
FIG. 5A is a flowchart of an aspect of a capacity monitoring aspect for a backhaul portion of the flowchart of FIG. 1.
Figure 5B:
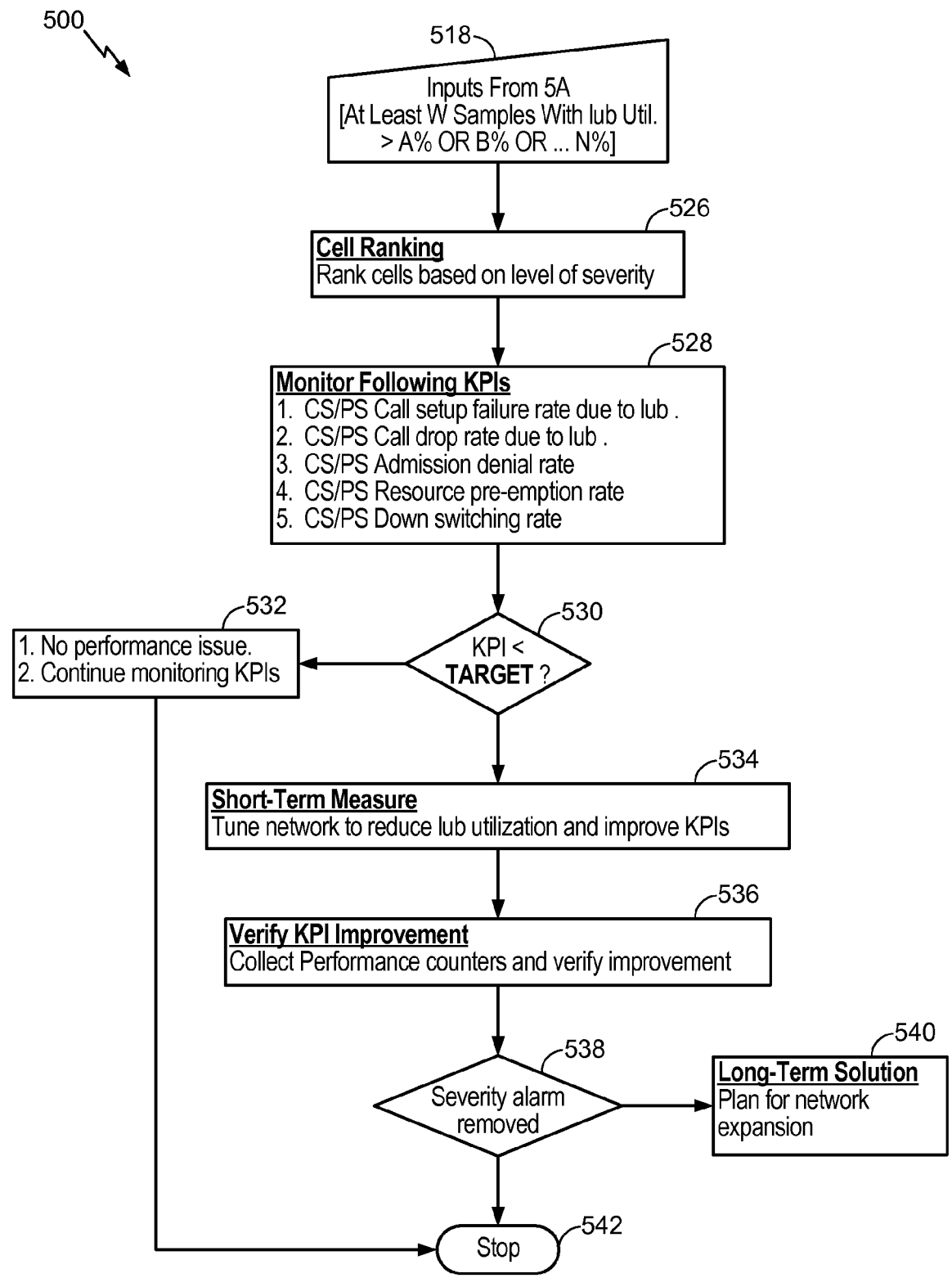
FIG. 5B is a flowchart of an aspect of a severity alarm and action item aspect for a backhaul portion of the flowchart of FIG. 1.
Figure 6:
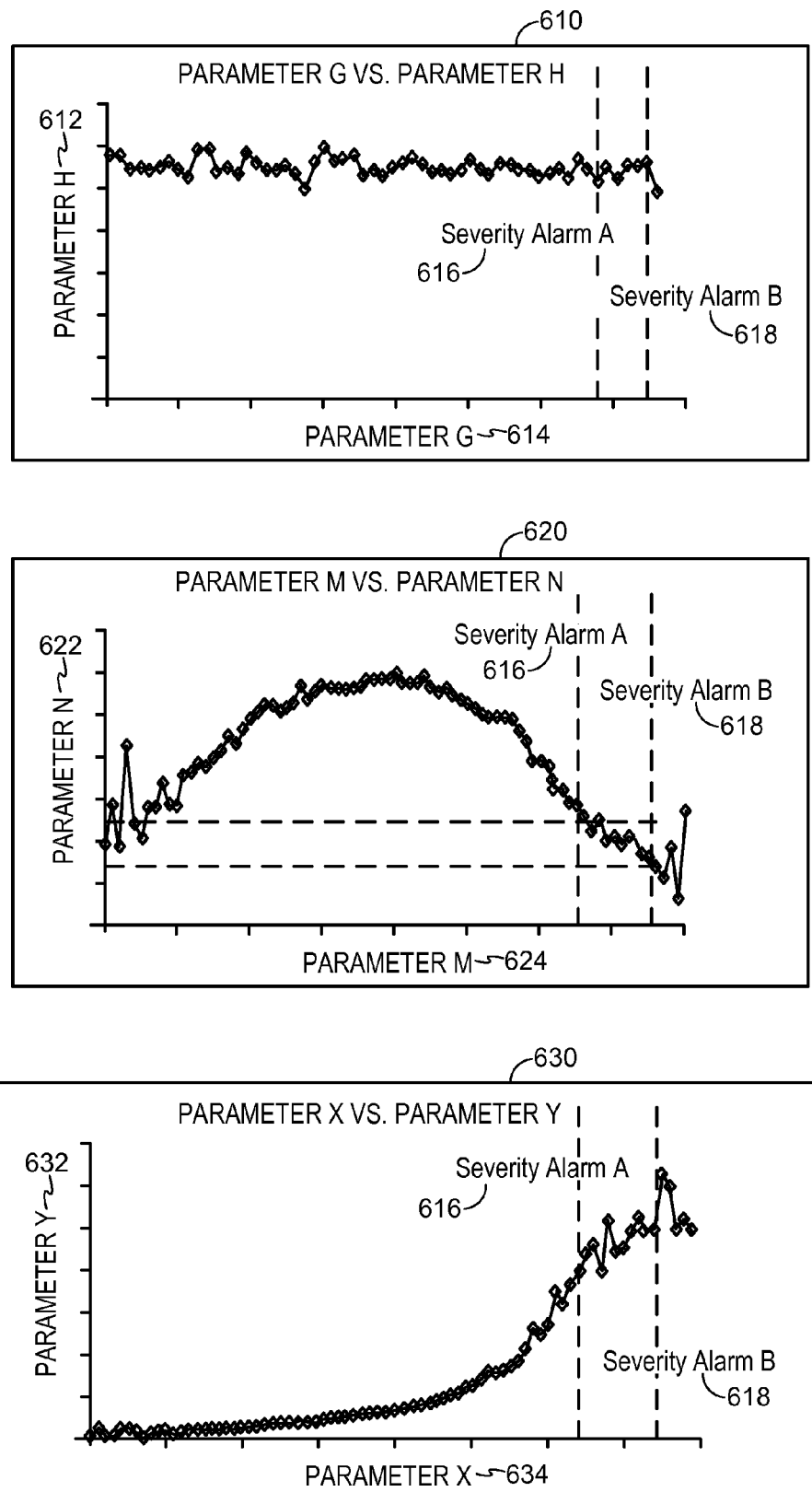
FIG. 6 is a series of graphs in an aspect of comparing a capacity attribute against a KPI, including one or more severity alarm thresholds identified therefrom.

Referring to FIG. 2B, at reference numeral 218, as described above with reference to FIG. 2A, one or more severity alarms may be triggered to generate one or more action items. At reference numeral 226, in one aspect, the severity alarms and/or action items may be ranked for each cell. Further, at reference numeral 228, defined KPIs are monitored. In one aspect, the defined KPIs may include but are not limited to: CS and/or PS call setup failure rate due to the particular CE; CS and/or PS call drop rate due to the particular CE; CS and/or PS admission denial rate; CS and/or PS resource preemption rate; and, CS and/or PS down switching rate. At reference numeral 230, it is determined if each respective KPI is less than a target KPI. In other words, one or more capacity attributes have triggered the severity alarm correspond to the capacity attributes, and the monitored KPIs associated with the triggering capacity attribute are tested against a respective target KPI to determine a root cause of the severity alarm.

If, at reference numeral 230, the given monitored KPI is not less than the target KPI, then at reference numeral 232 there is no performance issue with respect to the given monitored KPI and monitoring is continued.

On the other hand, if at reference numeral 230, the given monitored KPI is less than the target KPI, then there is a performance issue, and corrective actions may be taken. In one aspect, at reference numeral 234, a short term measure may be taken to improve the KPIs. For example, the short term measure may include tuning the network to reduce CE utilization and improve one or more of the monitored KPIs. Further, after such tuning, at reference numeral 236, the method may include verifying KPI improvement, such as by collecting subsequent performance information and measuring against the target KPI. Moreover, at reference numeral 238, it is determined whether the severity alarm has been removed. If the severity alarm has been removed, then at reference numeral 242 the actions to cure the severity alarm may be stopped. If the severity alarm has not been removed, then at reference numeral 240, the method may include taking a long-term action, such as expanding the network, etc.

Although not discussed in detail herein, the corresponding processes for soft capacity/power utilization, soft capacity/logical channelization resource utilization, and backhaul capacity/Iub are similar to those described above, and are respectively defined in FIGS. 3, 3A and 3B, FIGS. 4, 4A and 4B, FIGS. 5, 5A and 5B. Although logically similar, capacity attribute specific variations may be present with respect to methodologies discussed in FIGS. 2, 3, 4 and 5. For example, with reference to FIGS. 3, 4 and 5 additional KPIs, such as but not limited to: data user throughput, packet drop, packet delay, video metrics, and number of data users may be analyzed during monitoring of the network.

With respect to the plotting and threshold decision-making discussed with reference to FIGS. 2, 3, 4 and 5, FIG. 6 depicts, for example, different plots (610, 620, 630) of different performance parameter comparisons, e.g. parameter M (624) vs. N (622), G (614) vs. H (612), X (634) vs. Y (632), may be generated. The present apparatus and methods have found that plotting one performance parameter or KPI versus another performance parameter or KPI provides additional insight into monitoring network capacity or performance, at least with respect to other types of comparisons, such as, for example, plotting a single performance parameter or KPI over time. Further, based on such plotting, the present apparatus and methods may derive or determine one or more severity alarm levels, e.g. a "minor" severity alarm A (616, 626, 636) and a "major" severity alarm B (618, 628, 638). For example, such alarm thresholds may be based on trends or points of inflection identified within the plots. In the illustrated cases, for instance, a minor severity alarm A may be defined as a value determined to indicate that a network is moving toward a overloaded capacity situation, e.g. based on one or more of analysis of historical information, simulation studies, engineering judgment and network experience. Also, in the illustrated examples, a major severity alarm threshold B may be defined as a value determined to indicate that a network has serious current capacity issues, e.g. based on one or more of analysis of historical information, simulation studies, engineering judgment and network experience. It should be noted, however, that the major and minor severity alarm thresholds are just one example, and that more or less alarm thresholds having different network severity implications may be defined, depending on the scenario. For example, with reference to FIGS. 2A, 3A, 4A, 5A, the possibility of using multiple severity alarms is analyzing network capacity and performance is depicted.

Figure 7:
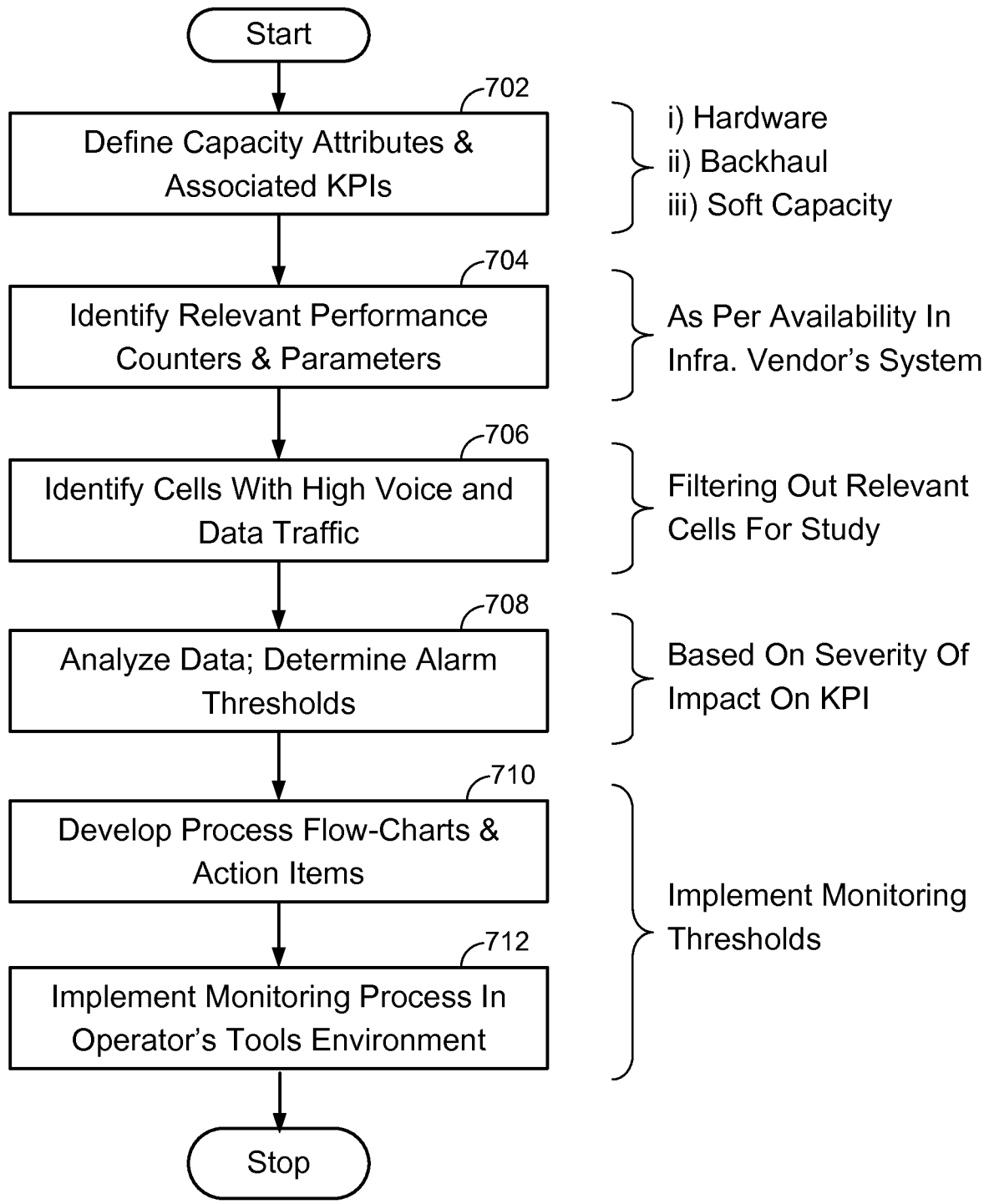
FIG. 7 is a flow chart of one aspect of a method of monitoring capacity attributes of a wireless network.

In summary, referring to FIG. 7, one aspect of the described method includes defining capacity attributes and associated KPIs for hardware, backhaul and soft capacity components of a network at reference numeral 702. Further, the method includes identifying relevant performance counters and parameters, e.g. performance information, available in the network of the given operator or vender at reference numeral 704. Also, in one aspect, the method includes filtering out or identifying relevant cells for study, e.g. cells with high voice and/or data traffic, at reference numeral 706. For example, these cells may be identified by sorting list of cells in descending order of voice and data traffic carried. Moreover, the method includes analyzing collected/historical/simulated performance data and determining one or more alarm thresholds based on a severity of impact on one or more KPIs at reference numeral 708. In one aspect, KPIs of interest may include, but are not limited to: CE utilization percentage; CS and/or PS call setup failure rate due to the particular CE; CS and/or PS call drop rate due to the particular CE; CS and/or PS admission denial rate; CS and/or PS resource preemption rate; CS and/or PS down switching; data user throughput; packet drop; packet delay; video metrics; and number of data users. Further, the method may include implementing monitoring thresholds to proactively monitor network capacity and tune the network, if necessary, to alleviate a detected severity of impact on one or more KPIs at reference numeral 710. Such implementing may include developing process flow charts and actions items, and performing the monitoring in a network operator's performance management tools environment at reference numeral 712.

Figure 8:
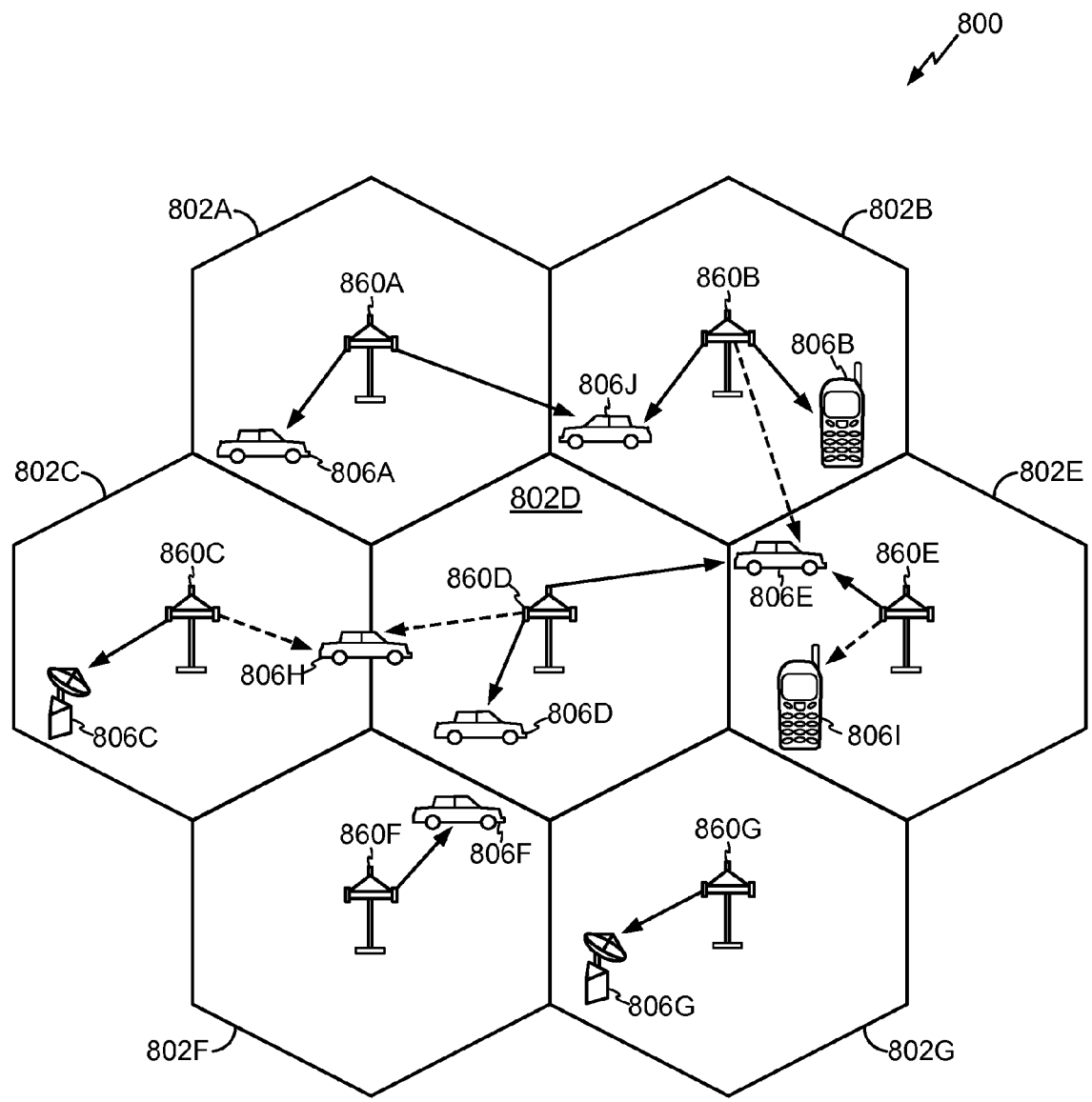
FIG. 8 is a schematic diagram of an exemplary cellular communication system according to one aspect.

Referring to FIG. 8, an example of a UMTS cellular communication system 800 operable to implement the described apparatus and methods includes one or more cells 802A-802G that each include a corresponding NodeB (base station) 860A-860G, and wherein one or more user equipment (UE) 806A-806G may communicate in a respective cell with a respective NodeB (base station) to connect to each other, to a wireline telephone, or to a packet-based network such as the Internet. Although this example is explained with reference to UMTS terminology, it should be noted that these principles may be applied to equivalent components in a network of any technology. The communication systems may use a single carrier frequency or multiple carrier frequencies. In wireless communication systems, a channel includes a downlink (DL) for transmissions from a respective NodeB (base station) 860 to a respective user equipment (UE) 806 and an uplink (UL) for transmissions from a respective user equipment (UE) 806 to a respective NodeB 860. Each link may incorporate a different number of carrier frequencies.

User equipment (UE) 806 is also known as a remote station, a mobile station, access terminal or a subscriber station. Furthermore, UE 806 may be any data device that communicates through a wireless channel. UE 806 may further be any of a number of types of devices including but not limited to PC card, compact flash, external or internal modem, or wireless or wireline phone. Also, UE 806 may be mobile or stationary.

Also, each NodeB 860 may include multiple sectors, wherein each sector provides at least one channel. A channel is defined as the set of communication links for transmissions between the NodeB 860 and the UEs 806 within a given frequency assignment. A UE 806 that has established an active traffic channel connection with one or more NodeB 860 is called an active UE 806, and is said to be in a traffic state. A UE 806 that is in the process of establishing an active traffic channel connection with one or more NodeBs 860 is said to be in a connection setup state.

Figure 9:
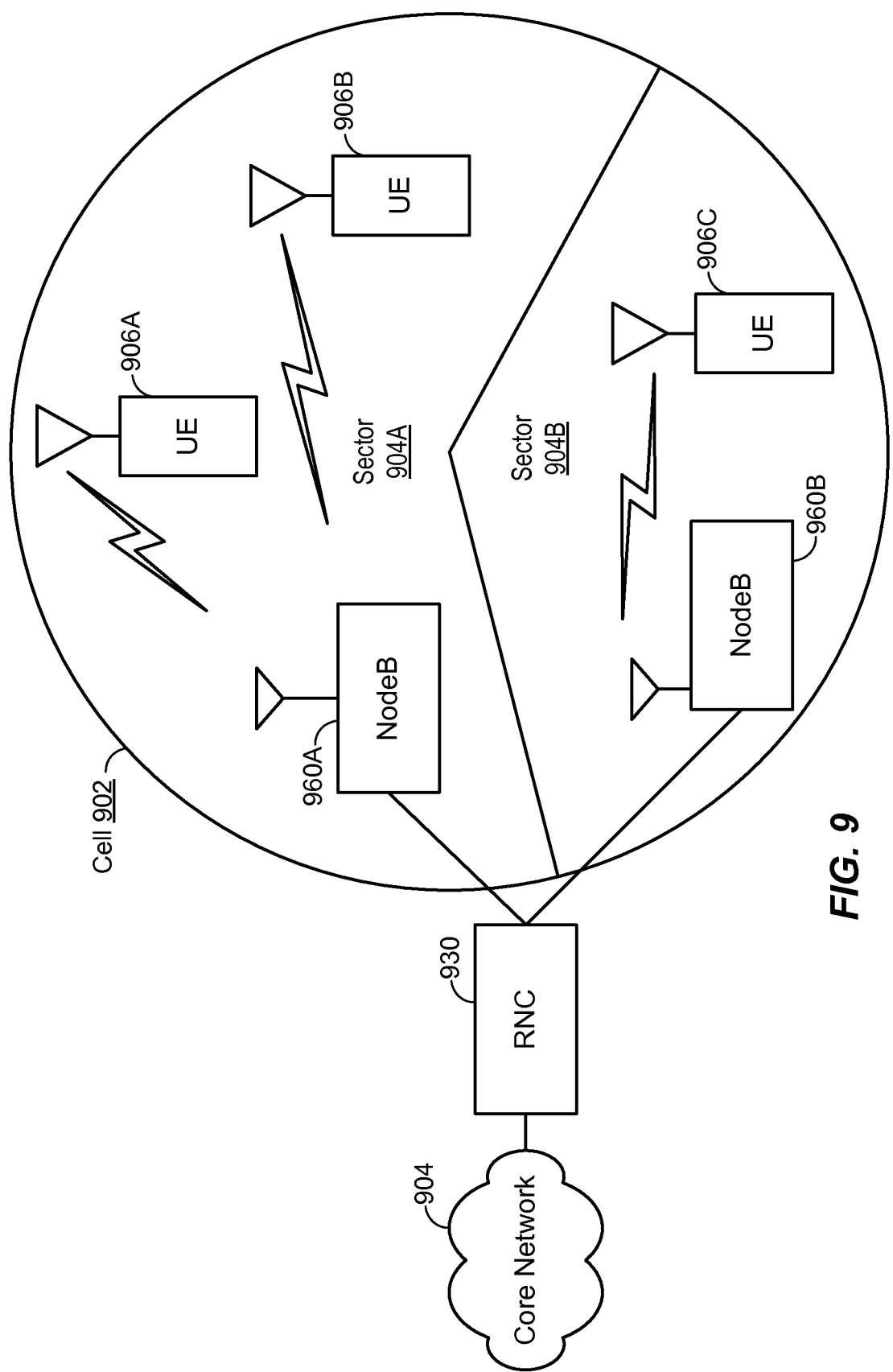
FIG. 9 is a schematic diagram of an aspect of a wireless network that includes a radio network controller and depicts network component interactions.

Referring to FIG. 9, an exemplary UMTS communication system includes radio network controller (RNC) 930 to provide an interface between core network 904 and all NodeBs 960 dispersed throughout a geographic region. For ease of explanation, two NodeBs 960A and 960B are shown. The geographic region is generally subdivided into smaller regions known as cells 902. Each NodeB 960 is configured to serve all UEs 906 in its respective cell 902. As depicted, the cell 902 may be divided into sectors (904A, 904B) with a NodeB, such as NodeB 960A or 960B, serving each sector (904A, 904B). In the illustrated scenario, three UEs 906A-C are shown in cell 902. Two UEs 906A-B are shown in communication with the NodeB 960A, serving sector 904A. One UE 906C is shown in communication with the NodeB 960B, serving sector 904B. Each UE 906A-C may access the core network 904, or communicate with other UEs 906, through one or more NodeBs 960, such as NodeBs 960A-B, under control of the RNC 930.

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications link. The channel allocations can take on various forms depending on the specific multi-access technique. By way of example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

Figure 10:
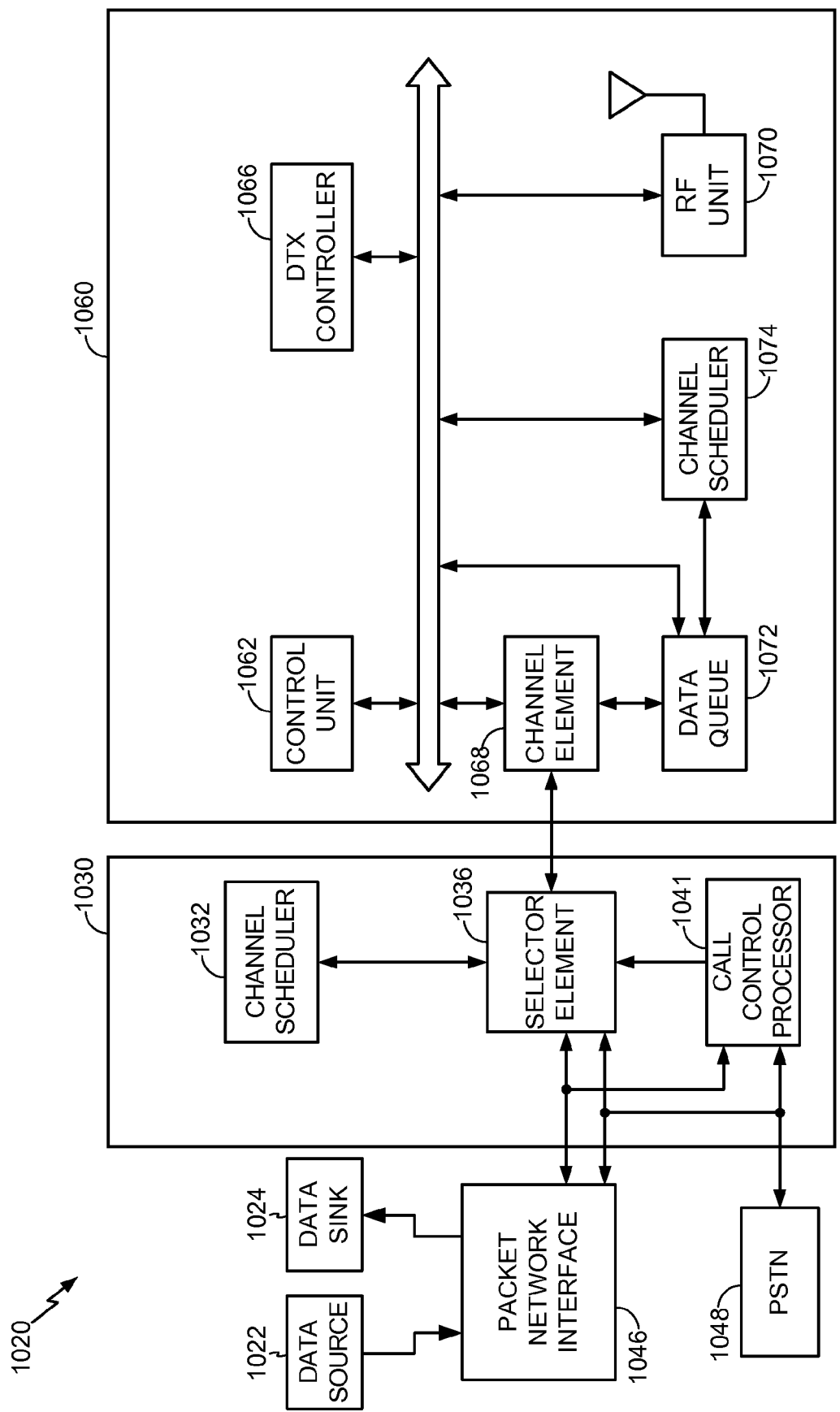
FIG. 10 is a schematic diagram of an aspect of network-side components of a wireless network.

Referring to FIG. 10, one example of a communication system 1020 includes NodeB 1060 interfacing with RNC 1030, which interfaces with a packet network interface 1046 and a Public Switched Telephone Network (PSTN) 1048. RNC 1030 includes a channel scheduler 1032 for implementing a scheduling algorithm for transmissions in system 1020. The channel scheduler 1032 determines the length of a service interval during which data is to be transmitted to any particular remote station based upon the remote station's associated instantaneous rate for receiving data.

In addition, the channel scheduler 1032 selects the particular data queue 1072 for transmission. The associated quantity of data to be transmitted is then retrieved from a data queue 1072 and provided to the channel element 1068 for transmission to the remote station associated with the data queue 1072. Channel scheduler 1032 selects the queue for providing the data, which is transmitted in a following service interval.

As noted, RNC 1030 interfaces with packet network interface 1046, Public Switched Telephone Network (PSTN), 1048, and all NodeBs in the communication system (for simplicity, only one NodeB 1060 is illustrated). RNC 1030 coordinates the communication between UEs in the communication system and other users connected to packet network interface 1046 and PSTN 1048. PSTN 1048 interfaces with users through a standard telephone network.

RNC 1030 contains many selector elements 1036 (for simplicity, only one is illustrated). Each selector element 1036 is assigned to control communication between one or more NodeB 1060 and one or more UEs (not shown). If selector element 1036 has not been assigned to a given UE, call control processor 1041 is informed of the need to page the respective UE. Call control processor 1041 then directs NodeB 1060 to page the UE.

Data source 1022 contains a quantity of data that is to be transmitted to a given UE. Data source 1022 provides the data to packet network interface 1046. Packet network interface 1046 receives the data and routes the data to the selector element 1036. Selector element 1036 then transmits the data to each NodeB 1060 in communication with the target UE. In the illustrated scenario, each NodeB 1060 maintains a data queue 1072, which stores the data to be transmitted to the UE.

The data is transmitted under the control of control unit 1062 and controller 1066 in data packets from data queue 1072 to channel element 1068. In one aspect, on the downlink, a "data packet" refers to a quantity of data and a quantity of data to be transmitted to a destination UE within a predetermined "time slot." In some aspects, channel element 1068 performs encoding of the data packet and control fields, and inserts a set of code tail bits. The data packet, control fields, cyclic redundancy check (CRC) parity bits, and code tail bits comprise a formatted packet. Further, in some aspects, channel element 1068 then encodes the formatted packet and interleaves (or reorders) the symbols within the encoded packet. For example, the interleaved packet is covered with an orthogonal variable spreading factor (OVSF) code. The spread data is provided to RF unit 1070 which modulates, filters, and amplifies the signal. The downlink signal is transmitted over the air through an antenna to the downlink (DL).

At the UE 1006 (see FIGS. 8 and 9), the downlink signal is received by an antenna and routed to a receiver. The receiver filters, amplifies, demodulates, and quantizes the signal. The digitized signal is provided to a demodulator (DEMOD) where it is de-spread. The demodulated data is provided to a decoder which performs the inverse of the signal processing functions done at NodeB 1060, specifically the de-interleaving, decoding, and CRC check functions. The decoded data is provided to a data sink 1024.

The signal transmitted by each UE 1006 travels through an uplink (UL) channel and is received at NodeB 1060 through a receive antenna coupled to RF unit 1070. In the illustrated scenario, the information is demodulated in channel element 168 and provided to a channel scheduler 1032 located in RNC 1030 or to a channel scheduler 1074 located in the NodeB 1060. In an aspect, the channel scheduler 1074 is located in the NodeB 1060. In an alternate aspect, the channel scheduler 1032 is located in the RNC 1030, and connects to all selector elements 1036 within the RNC 1030. It should be noted that RNC 1030 and NodeB 1060 may each further include a memory for storing a computer readable medium, instructions or codes that are executable by a processor to perform the above-described functionality.

Further, the capacity attribute monitoring, severity thresholds and action items executed in the present method and apparatus may, in one aspect, be stored in a memory of a computer device, such as a network component, as computer-readable instructions, instructions or codes which may be executed by a control unit, which may include one or more processors. Such a network component may be in communication with an operator network in a wired or wireless manner.

Figure 11:
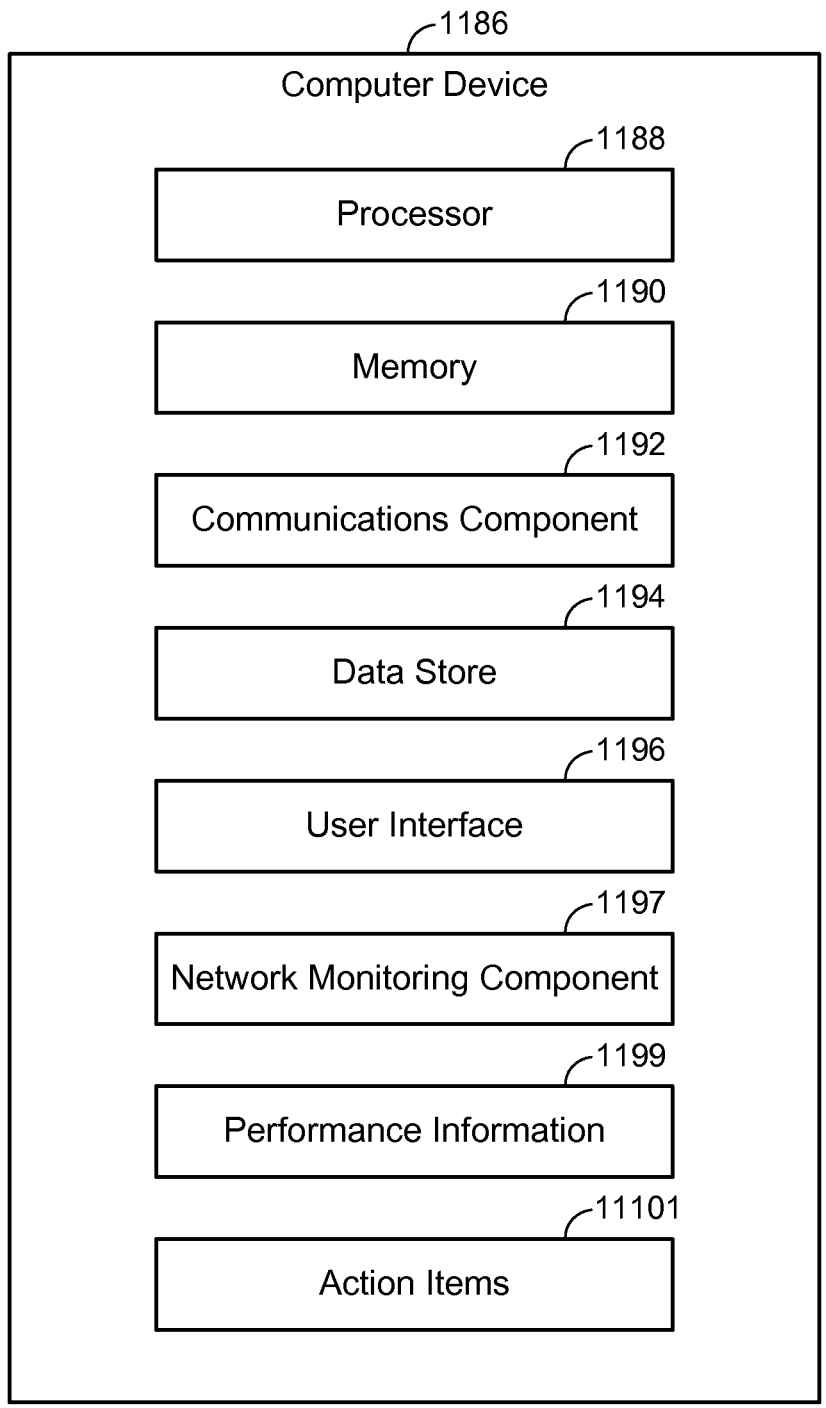
FIG. 11 is a schematic diagram of an aspect of a computer device configured to implement the method of monitoring capacity attributes of a wireless network and initiating or generating action items described herein.

Referring to FIG. 11, in one aspect, computer device 1186 includes a processor 1188 for carrying out processing functions associated with one or more of components and functions described herein. Processor 1188 can include a single or multiple set of processors or multi-core processors. Moreover, processor 1188 can be implemented as an integrated processing system and/or a distributed processing system. Further, processor 1188 may include corresponding processing logic.

Computer device 1186 further includes a memory 1190, such as for storing local versions of applications being executed by processor 1188. Memory 1190 can include any type of memory usable by a computer, such as one or more memory elements including, but not limited to, random access memory (RAM), read only memory (ROM), tapes, magnetic discs, optical discs, volatile memory, non-volatile memory, and any combination thereof.

Further, computer device 1186 includes a communications component 1192 that provides for establishing and maintaining communications with one or more parties utilizing hardware, software, and services as described herein. Communications component 1192 may carry communications between components on computer device 1186, as well as between computer device 1186 and external devices, such as devices located across a communications network and/or devices serially or locally connected to computer device 1186. For example, communications component 1192 may include one or more buses, and may further include transmit chain components and receive chain components associated with a transmitter and receiver, respectively, operable for interfacing with external devices. Also, communications component 1192 may include a transceiver. For instance, communications component 1192 connects computer device 1186 with wireless network 800 (FIG. 8), enabling computer device 1186 to obtain and monitor capacity attributes and KPIs for wireless networks with mixed voice and data traffic usage, and perform action items in order to avoid any adverse impacts on either network performance or user perception.

Additionally, computer device 1186 may further include a data store 1194, which can be any suitable combination of hardware and/or software, that provides for mass storage of information, databases, and programs employed in connection with aspects described herein. For example, data store 1194 may be a data repository for applications not currently being executed by processor 1188.

Computer device 1186 may additionally include a user interface component 1196 operable to receive inputs from a user of computer device 1186 and further operable to generate outputs for presentation to the user. User interface component 1196 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1196 may include one or more output devices, including but not limited to a display, a speaker, a haptic feedback mechanism, a printer, any other mechanism capable of presenting an output to a user, or any combination thereof.

Further, for example, computer device 1186 may include network monitoring component 1197 for performing the capacity monitoring process described herein. For example, network monitoring component 1197 may include one or more of hardware, software, firmware, computer-executable instructions, etc. For instance, network monitoring component 1197 may include network monitoring rules and logics to perform one or more of: defining one or more capacity attributes and one or more key performance indicators (KPIs) associated with the network, obtaining raw data associated with one or more capacity attributes and the one or more KPIs, determining at least one alarm threshold from the obtained raw data, monitoring the network to determine if any of the at least one alarm thresholds has been triggered, upon a determination that at least one alarm thresholds has been triggered, generating one or more action items to improve network performance and user communications experience; and initiating, by a computer device in communication with the network, at least one of the action items in response to a monitored performance parameter triggering one of the alarm thresholds and generating process flow charts and carrying out actions items, and performing on-going monitoring in a network operator's tools environment.

Also, the computer device 1186 may include the performance information 1199 described above, including but not limited to performance counter and other performance parameters. Such performance information may be used to determine and monitor capacity attributes and KPIs. In one aspect, capacity attributes of interest may include but are not limited to: channel element utilization, which relates to hardware capacity, power utilization, which relates to soft capacity, logical channelization resource utilization, which also relates to soft capacity, and Iub utilization, e.g. the interface between the NodeB and the radio network controller (RNC), which relates to backhaul capacity. Further, KPIs of interest may include, but are not limited to: CS and/or PS call setup failure rate due to the particular CE; CS and/or PS call drop rate due to the particular CE; CS and/or PS admission denial rate; CS and/or PS resource preemption rate; CS and/or PS down switching; data user throughput; packet drop; packet delay; video metrics; and number of data users. Such performance information 1199 may be stored, for example, in memory 1190 and/or data store 1194.

Moreover, the computer device 1186 may include the action items 11101 described above, including capacity attribute and KPI-specific tuning network instructions or rules.

Thus, computer device 1186 is configured to operate the processes described herein for monitoring the capacity attributes and KPIs of wireless networks.

Figure 12:
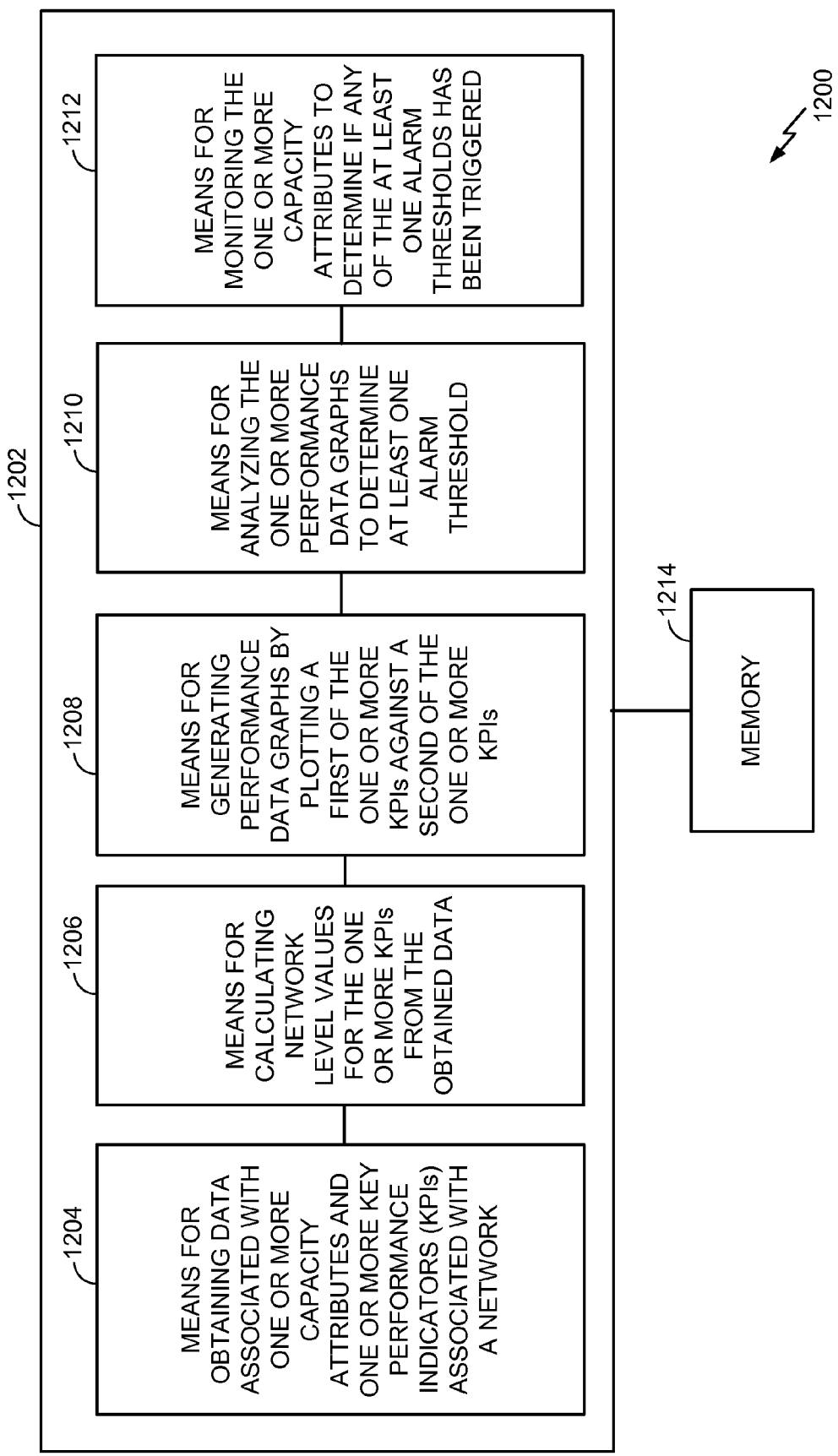
FIG. 12 depicts a block diagram of an exemplary communication system that can facilitate a network capacity monitoring process.

With reference to FIG. 12, illustrated is a system 1200 that facilitates capacity monitoring and recommending action for a wireless network. For example, system 1200 can reside at least partially within a base station, mobile device, etc. According to another example aspect, system 1200 can reside at least partially within a NodeB. It is to be appreciated that system 1200 is represented as including functional blocks, which can be functional blocks that represent functions implemented by a processor, software, or combination thereof (e.g., firmware). System 1200 includes a logical grouping 1202 of means that can act in conjunction. For instance, logical grouping 1202 can include means for obtaining data associated with one or more capacity attributes and one or more key performance indicators (KPIs) associated with a network 1204. Further, logical grouping 1202 can comprise means for calculating network level values for the one or more KPIs from the obtained data 1206. For example, such information may include counter data, such as counter data with statistical relevance, and such counters may be collected for individual consideration or for combining together to form new, combined performance information. Such information may be collected for a given time period, for example, a historical time period that may be representative of a long term operation of the network. Further, logical grouping 1202 can comprise means for generating performance data graphs by plotting a first of the one or more KPIs against a second of the one or more KPIs 1208.

Further, logical grouping 1202 can comprise means for analyzing the one or more performance data graphs to determine at least one alarm threshold 1210. For example, the at least one alarm threshold may include a major alarm threshold and a minor alarm threshold, wherein the major alarm threshold is triggered when network and or user performance is severely degraded, and wherein the minor alarm threshold is triggered when network usage is trending toward degradation of network and/or user performance. Further, logical grouping 1202 can comprise means for monitoring the one or more capacity attributes to determine if any of the at least one alarm thresholds has been triggered 1212. In one aspect, KPIs to be monitored may include at least one of: a channel element utilization percentage, or an Iub utilization percentage, or a power utilization percentage, or a logical channelization resource utilization percentage, or any combination thereof. Additional KPIs to be monitored may include at least one of: circuit switched\packet switched (CS\PS) call set up failure rate due to the applicable capacity attribute from the one or more capacity attributes, or CS\PS call drop rate due to the applicable capacity attribute from the one or more capacity attributes, CS\PS admission denial rate, or CS\PS resource pre-emption rate, or CS\PS down switching rate, or data user throughput, packet drop, packet delay, video metrics, or number of data users, or any combination thereof. Additionally, system 1200 can include a memory 1214 that retains instructions for executing functions associated with the means 1204, 1206, 1208, 1210 and 1212. While shown as being external to memory 1214, it is to be understood that one or more of the means 1204, 1206, 1208, 1210 and 1212 can exist within memory 1214.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as UMTS, CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for monitoring a network, comprising:
   obtaining data associated with one or more network capacity attributes and one or more key performance indicators (KPIs) from one or more cells included in a network during a collection period;
   determining that an event occurred for a particular time within the collection period, the event being at least one of a network outage and a hardware failure; excluding from the obtained data abnormal data obtained for the particular time of the event and based on the event;
   calculating network level values for the one or more KPIs from the data obtained from the one or more cells after the abnormal data is excluded from the obtained data;
   generating one or more performance data graphs by plotting a first of the one or more KPIs against a second of the one or more KPIs, the first of the one or more KPIs being a capacity utilization percentage based on the one or more network capacity attributes;
   analyzing the one or more performance data graphs by determining a correlation between the second of the one or more KPIs and the capacity utilization percentage to determine a plurality of alarm thresholds including a major alarm threshold and a minor alarm threshold, wherein the major alarm threshold is triggered when network performance is severely degraded, and wherein the minor alarm threshold is triggered when network usage is trending toward degradation of network performance; and monitoring the one or more capacity attributes to determine if any of the alarm thresholds has been triggered.

2. The method of claim 1, further comprising:

storing one or more action items to improve network performance and user communications experience; and initiating, by a computer device in communication with the network, at least one of the action items in response to a monitored capacity attribute triggering one of the alarm thresholds.

3. The method of claim 2, further comprising:

retuning at least one of the one or more capacity attributes for the network as determined by the at least one action item;

monitoring the retuned network to determine if any of the alarm thresholds has been triggered;

upon a determination that at least one of the alarm thresholds has been triggered in the retuned network, generating one or more long term action items to facilitate long term improvements in network performance and user communications experience.

4. The method of claim 1, wherein the one or more capacity attributes include at least one of: network hardware capacity attributes, or network backhaul capacity attributes, or network software attributes, or any combination thereof.

5. The method of claim 4, wherein the network hardware capacity attributes includes channel element utilization, network backhaul capacity attributes includes Iub utilization, and the network software attributes includes power utilization and logical channelization resource utilization.

6. The method of claim 1, wherein the network level values for the first of the one or more KPIs include at least one of a channel element utilization percentage, an Iub utilization percentage, a power utilization percentage, and a logical channelization resource utilization percentage.

7. The method of claim 1, wherein the network level values for the second of the one or more KPIs includes at least one of circuit switched\ packet switched (CS\PS) call set up failure rate due to the applicable capacity attribute from the one or more capacity attributes, CS\PS call drop rate due to the applicable capacity attribute from the one or more capacity attributes, CS\PS admission denial rate, CS\PS resource preemption rate, CS\PS down switching rate, data user throughput, packet droppacket delay, and video metrics or number of data users.

8. The method of claim 1, wherein the monitoring further comprises:

determining if more than one alarm threshold has been triggered; and upon a determination that more than one alarm threshold has been triggered, ranking the multiple alarms by order of severity, wherein the severity is partly defined by level of network usage interruption.

9. The method of claim 8, wherein the ranking further comprises: ranking, among one or more cells associated with the network, which cell has the greater severity alarm triggered.

10. The method of claim 8, wherein the ranking further comprises: ranking, among the one or more capacity attributes that triggered an alarm threshold, which of the one or more capacity attributes that triggered an alarm threshold has the greater severity alarm triggered.

11. The method of claim 1, wherein the monitoring further comprises:

monitoring at least one of the one or more capacity attributes over a predetermined duration of time, wherein the duration is defined by a time period needed to obtain statistically relevant comparison data.

12. The method of claim 1, wherein the monitoring is performed for at least a portion of the one or more cells.

13. The method of claim 12, further comprising:

determining the portion of the one or more cells by selecting cells in which voice and data traffic levels exceed a general threshold level.

14. At least one processor configured to generate performance measurements for a wireless network, wherein the at least one processor includes:

a first module for obtaining data associated with one or more network capacity attributes and one or more key performance indicators (KPIs) from one or more cells included in a network;

a second module for determining that an event occurred for a particular time within a collection period, the event being at least one of a network outage and a hardware failure and for excluding from the obtained data abnormal data obtained for the particular time of the event and based on the event;

a third module for calculating network level values for the one or more KPIs from the data obtained from the one or more cells after the abnormal data is excluded from the obtained data;

a fourth module for generating one or more performance data graphs by plotting a first of the one or more KPIs against a second of the one or more KPIs, the first of the one or more KPIs being a capacity utilization percentage based on the one or more network capacity attributes;

a fifth module for analyzing the one or more performance data graphs by determining a correlation between the second of the one or more KPIs and the capacity utilization percentage to determine a plurality of alarm thresholds including a major alarm threshold and a minor alarm threshold, wherein the major alarm threshold is triggered when network performance is severely degraded, and wherein the minor alarm threshold is triggered when network usage is trending toward degradation of network performance; and a sixth module for monitoring the one or more capacity attributes to determine if any of the alarm thresholds has been triggered.

15. A computer program product, comprising:

a non-transitory computer-readable medium comprising:

a first set of codes for causing a computer to obtain data associated with one or more network capacity attributes and one or more key performance indicators (KPIs) from one or more cells included in a network;

a second set of codes for causing a computer to determine that an event occurred for a particular time within a collection period, the event being at least one of a network outage and a hardware failure and exclude from the obtained data abnormal data obtained for the particular time of the event and based on the event;

a third set of codes for causing a computer to calculate network level values for the one or more KPIs from the data obtained from the one or more cells after the abnormal data is excluded from the obtained data;

a fourth set of codes for causing a computer to generate one or more performance data graphs by plotting a first of the one or more KPIs against a second of the one or more KPIs, the first of the one or more KPIs being a capacity utilization percentage based on the one or more network capacity attributes;

a fifth set of codes for causing a computer to analyze the one or more performance data graphs by determining a correlation between the second of the one or more KPIs and the capacity utilization percentage to determine a plurality of alarm thresholds including a major alarm threshold and a minor alarm threshold, wherein the major alarm threshold is triggered when network performance is severely degraded, and wherein the minor alarm threshold is triggered when network usage is trending toward degradation of network performance; and a sixth set of codes for causing a computer to monitor the one or more capacity attributes to determine if any of the alarm thresholds has been triggered.

16. An apparatus, comprising:

means for obtaining data associated with one or more network capacity attributes and one or more key performance indicators (KPIs) from one or more cells included in a network;

means for determining that an event occurred for a particular time within a collection period, the event being at least one of a network outage and a hardware failure;

means for excluding from the obtained data abnormal data obtained for the particular time of the event and based on the event;

means for calculating network level values for the one or more KPIs from the data obtained from the one or more cells after the abnormal data is excluded from the obtained data;

means for generating one or more performance data graphs by plotting a first of the one or more KPIs against a second of the one or more KPIs, the first of the one or more KPIs being a capacity utilization percentage based on the one or more network capacity attributes;

means for analyzing the one or more performance data graphs by determining a correlation between the second of the one or more KPIs and the capacity utilization percentage to determine a plurality of alarm thresholds including a major alarm threshold and a minor alarm threshold, wherein the major alarm threshold is triggered when network performance is severely degraded, and wherein the minor alarm threshold is triggered when network usage is trending toward degradation of network performance; and means for monitoring the one or more capacity attributes to determine if any of the alarm thresholds has been triggered.

17. An apparatus for monitoring a network, comprising:

a performance information module physically coupled to a hardware processor and operable for:

obtaining data associated with one or more network capacity attributes and one or more key performance indicators (KPIs) from one or more cells included in a network;

determining that an event occurred for a particular time within a collection period, the event being at least one of a network outage and a hardware failure;

excluding from the obtained data abnormal data obtained for the particular time of the event and based on the event;

calculating network level values for the one or more KPIs from the data obtained from the one or more cells after the abnormal data is excluded from the obtained data;

generating one or more performance data graphs by plotting a first of the one or more KPIs against a second of the one or more KPIs, the first of the one or more KPIs being a capacity utilization percentage based on the one or more network capacity attributes; and analyzing the one or more performance data graphs by determining a correlation between the second of the one or more KPIs and the capacity utilization percentage to determine a plurality of alarm thresholds including a major alarm threshold and a minor alarm threshold, wherein the major alarm threshold is triggered when network performance is severely degraded, and wherein the minor alarm threshold is triggered when network usage is trending toward degradation of network performance; and a network monitoring module operable for:

monitoring the one or more capacity attributes to determine if any of the alarm thresholds has been triggered.

18. The apparatus of claim 17 further comprising:

an action item module coupled to the hardware processor and operable for:

storing one or more action items to improve network performance and user communications experience; and initiating, by a computer device in communication with the network, at least one of the action items in response to a monitored capacity attribute triggering one of the alarm thresholds.

19. The apparatus of claim 18, further comprising:

wherein the network monitoring module is further operable for:

retuning at least one of the one or more capacity attributes for the network as determined by the at least one action item;

monitoring the retuned network to determine if any of the alarm thresholds has been triggered; and the action item module operable for:

generating one or more long term action items, upon a determination that at least one of the alarm thresholds has been triggered in the retuned network, to facilitate long term improvements in network performance and user communications experience.

20. The apparatus of claim 17, wherein the one or more capacity attributes include at least one of network hardware capacity attributes, network backhaul capacity attributes, and network software attributes.

21. The apparatus of claim 20, wherein the network hardware capacity attributes includes channel element utilization, network backhaul capacity attributes includes Iub utilization, and the network software attributes includes power utilization and logical channelization resource utilization.

22. The apparatus of claim 17, wherein the network level values for the first of the one or more KPIs include at least one of a channel element utilization percentage, an Iub utilization percentage, a power utilization percentage, and a logical channelization resource utilization percentage.

23. The apparatus of claim 17, wherein the network level values for the second of the one or more KPIs includes at least one of circuit switched\packet switched (CS\PS) call set up failure rate due to the applicable capacity attribute from the one or more capacity attributes, CS\PS call drop rate due to the applicable capacity attribute from the one or more capacity attributes, CS\PS admission denial rate, CS\PS resource pre-emption rate, CS\PS down switching rate, data user throughput, packet drop, packet delay, video metrics, and number of data users.

24. The apparatus of claim 17, wherein the network monitoring module is further operable for:
   determining if more than one alarm threshold has been triggered; and
   upon a determination that more than one alarm threshold has been triggered, ranking the multiple alarms by order of severity, wherein the severity is partly defined by level of network usage interruption.

25. The apparatus of claim 24, wherein the network monitoring module is further operable for:
   ranking, among one or more cells associated with the network, which cell has the greater severity alarm triggered.

26. The apparatus of claim 24, wherein the network monitoring module is further operable for:
   ranking, among the one or more capacity attributes that triggered an alarm threshold, which of the one or more capacity attributes that triggered an alarm threshold has the greater severity alarm triggered.

27. The apparatus of claim 17, wherein the network monitoring module is further operable for:
   monitoring at least one of the one or more capacity attributes over a predetermined duration of time, wherein the duration is defined by a time period needed to obtain statistically relevant comparison data.

28. The apparatus of claim 17, wherein the network monitoring module is further operable for:
   monitoring at least a portion of the one or more cells.

29. The apparatus of claim 28, wherein the network monitoring module is further operable for
   determining the portion of the one or more cells by selecting cells in which voice and data traffic levels exceed a general threshold level.

* * * * *